United States Patent [19]

Toyoda

[11] Patent Number: 5,167,007
[45] Date of Patent: Nov. 24, 1992

[54] MULTILAYERED OPTICAL NEURAL NETWORK SYSTEM

[75] Inventor: Haruyoshi Toyoda, Fukuroi, Japan

[73] Assignee: Hamamatsu Photonics K.K., Japan

[21] Appl. No.: 598,173

[22] Filed: Oct. 12, 1990

[30] Foreign Application Priority Data

Oct. 17, 1989 [JP] Japan ................................. 1-269718

[51] Int. Cl.$^5$ .............................................. G06F 15/18
[52] U.S. Cl. ........................................................ 395/25
[58] Field of Search ............................. 364/513; 395/25

[56] References Cited

U.S. PATENT DOCUMENTS

| | | | |
|---|---|---|---|
| 4,815,027 | 3/1989 | Tokumitsu et al. | 364/841 |
| 4,837,843 | 6/1989 | Owechko . | |
| 4,860,253 | 8/1989 | Owechko et al. . | |
| 4,862,406 | 8/1989 | Fisher . | |
| 4,959,532 | 9/1990 | Owechko | 250/201.9 |
| 4,961,615 | 10/1990 | Owechko et al. | 350/3.68 |
| 5,004,309 | 4/1991 | Caulfield et al. | 350/3.68 |

FOREIGN PATENT DOCUMENTS 63-307437 12/1988 Japan .

OTHER PUBLICATIONS

Optical associatron: a simple model for optical associative memory, Ishikawa et al., Jun. 15, 1989/vol. 28, No. 2/Applied Optics.
Optical implementation of the Hopfield model, Farhat et al, May 15, 1985/ vol. 24, No. 10/ Applied Optics.
Experimental studies on adaptive optical associative memory, Ishikawa et al, SPIE vol. 963, pp. 527-536 (1988).
Photorefractive Optical Neural Networks, Yuri Owechko, 10A1/(Invited), pp. 142-146.
Current Status of Optical Neural Networks and Their Devices; Kyuma; 1082 (invited), pp. 147-149.

*Primary Examiner*—Allen R. MacDonald
*Attorney, Agent, or Firm*—Oliff & Berridge

[57] ABSTRACT

A multilayered optical neural network system comprise an input layer, an output layer, at least one hidden layer provided between the input layer and the output layer, a memory matrix holding device provided between the respective layers for holding weighted couplings between the layers, a correlation operating device for optically computing a correlation between an output optical pattern from the previous layer and the memory matrix pattern, an output function operating device for implementing optical computing of an output function corresponding to a result of the correlation operation, and a memory matrix correcting device provided between the respective layers for optically correcting a memory matrix held in the memory matrix holding device by a learning operation, whereby the system is capable of two-dimensional optical computing of all data transfers and operations and executing a great amount of computing without use of holograms.

9 Claims, 23 Drawing Sheets 18, 22 = MEMORY MATRIX HOLDING MEANS
36, 37 = OUTPUT FUNCTION DIFFERENTIAL OPERATING MEANS
42, 38 = MEMORY MATRIX CORRECTING MEANS F I G. 16
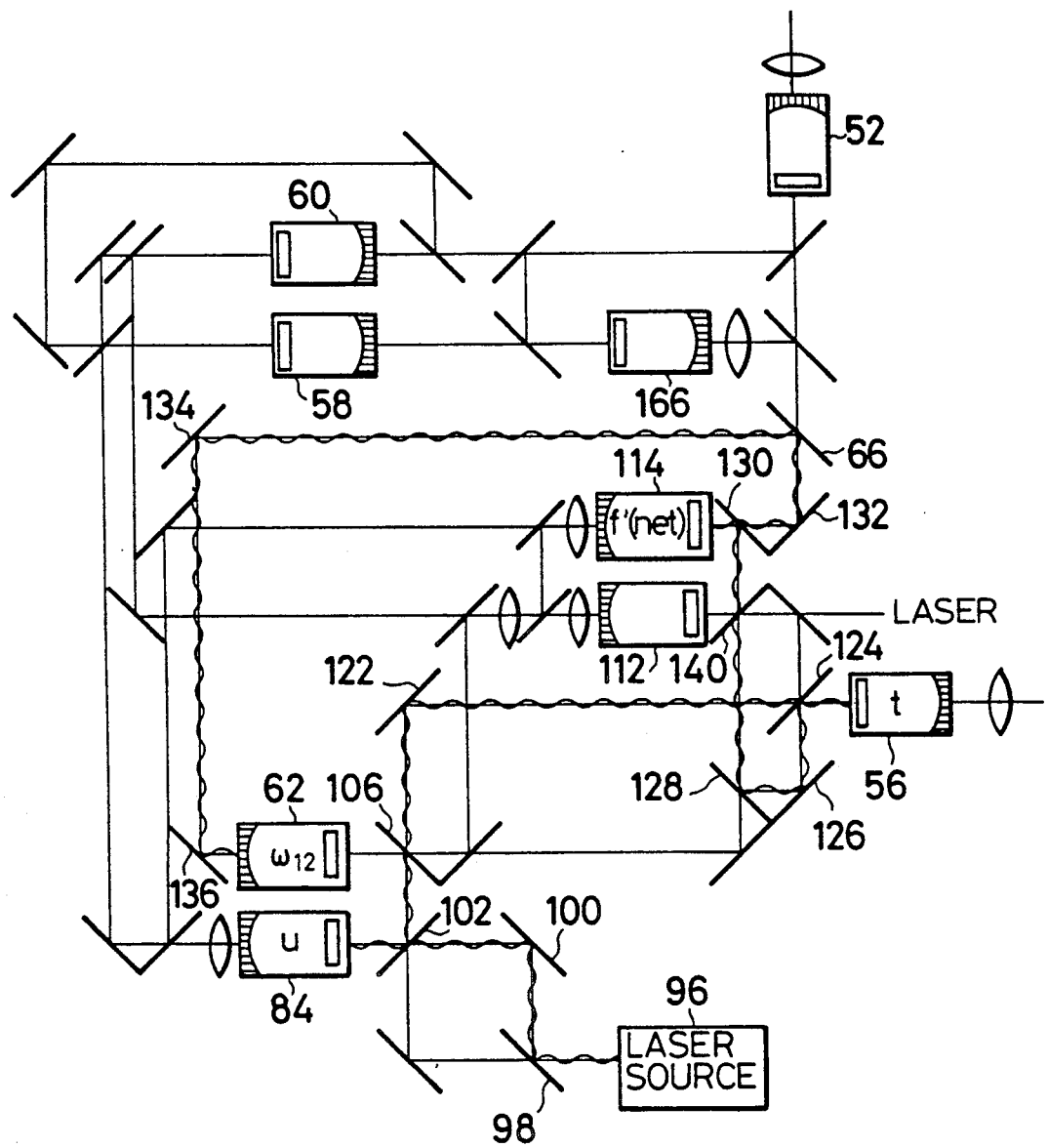

F I G. 17
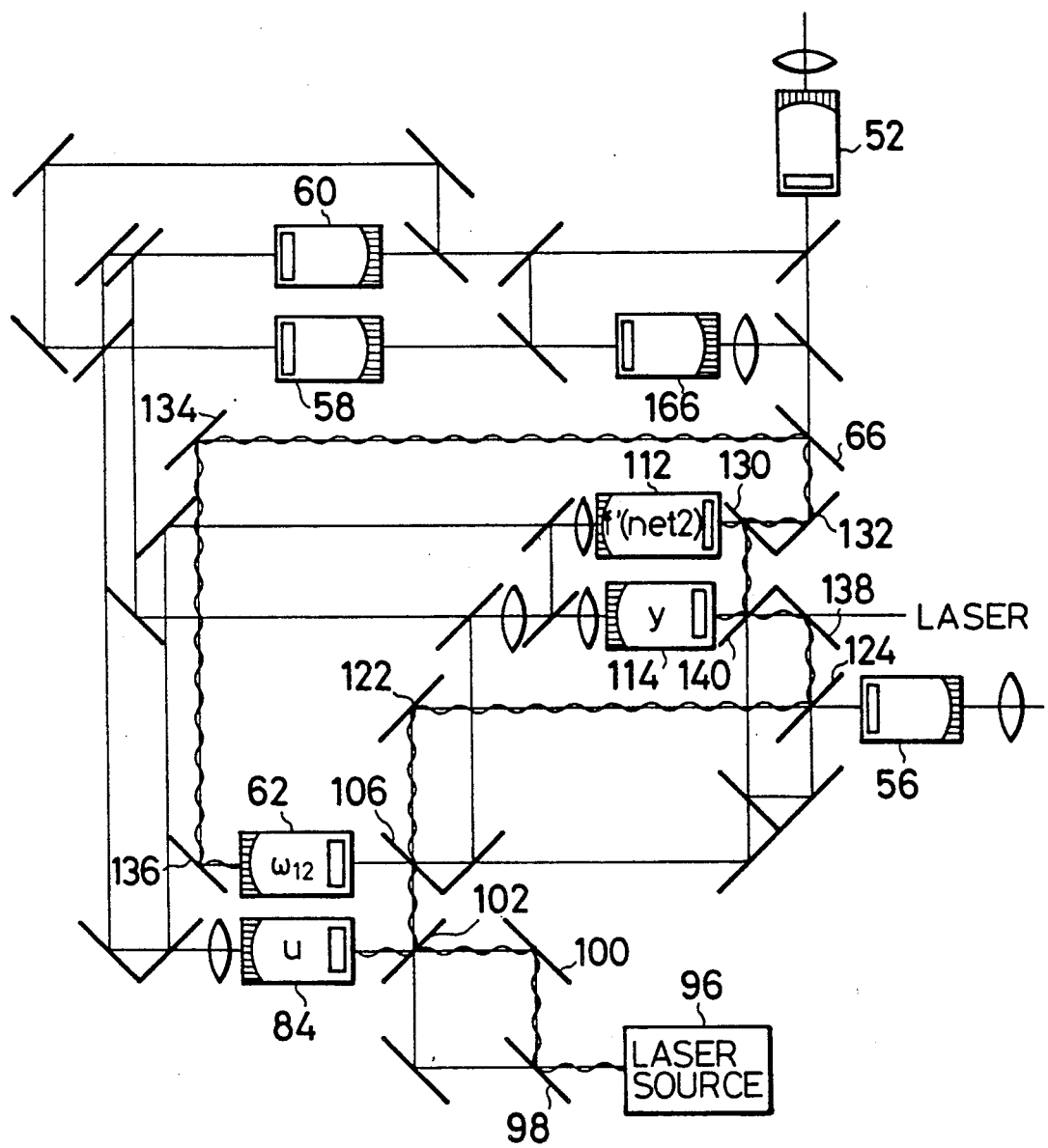

F I G. 18
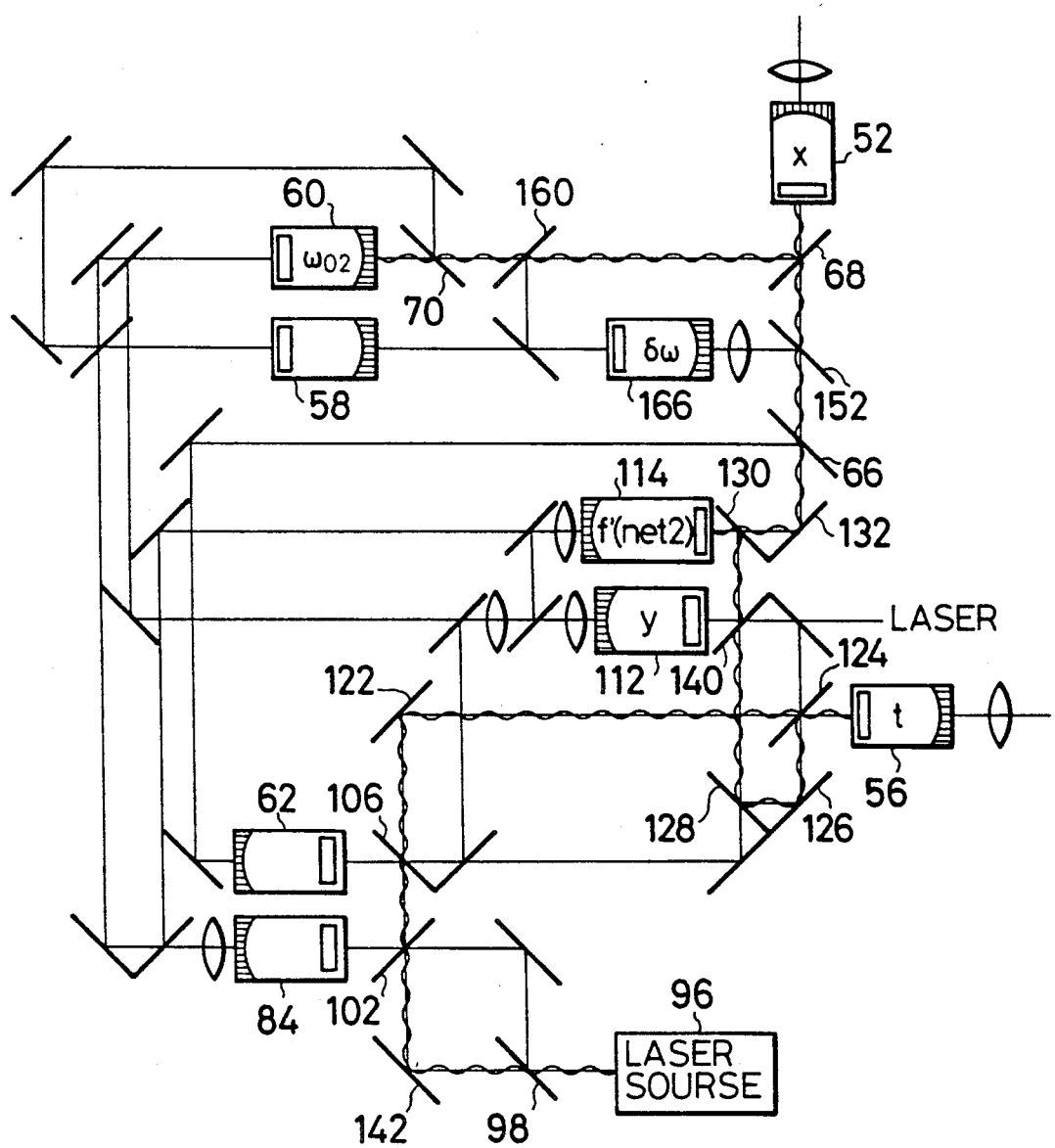

MULTILAYERED OPTICAL NEURAL NETWORK SYSTEM

BACKGROUND OF THE INVENTION

1. Field of the Invention

The present invention relates to a multilayered optical associative memory device or an optical neural network device.

2. Description of the Prior Art

Numerous studies are known which parallelly implement large volume computation problems on a neural network utilizing the parallel property of light. Many optical computers used in those studies employ holograms, for example:

A1. Y. Owechko, "Hybrid optical and electronic associative memory", (U.S. Pat. No. 4,837,843);
A2. Y. Owechko, Optical Computing 90, 10-a-1 (1990);
A3. A. Yariv. et. al., Phys. Lett. 48, (1986) 1114;
A4. Kitayama K., et. al., IJCNN 1989 Vol. 2,465–741 (1989);
A5. E. G. Peak, D. Psaltis, Optical Engineering, Vol. 26, No. 5,428 (1987);
A6. Y. S. Abu-Mostafa, Demetri Psaltis, Sci. Am., Vol. 256, No. 3, PP 66–73 (1987).

Use of such holograms, however, leads to the problem that crosstalk might be produced upon multiplexing. This is a problem the devices being integrated and a problem an optical hologram computing system.

To solve these problems, a number of studies to realize an associative memory without use of a hologram have been proposed for example:

B1. Fisher, A. D., "Adaptive Associative-Processing Optical Computing Architectures", (U.S. Pat. No. 4,862,406);
B2. H. J. Caulfield, SPIE, 456,2, Optical Computing (1984);
B3. K. Kyuma, Optical Computing 90,10-A-2 (1990);
B4. N. H. Farhat, et. al., Applied Optics, Vol. 24, No. 10,1469 (1985);
B5. N. Mukohzaka, U.S. patent Ser. Nos. 07/203,909 filed Jun. 8, 1992 now abandoned and 07/204,350 filed Jun. 9, 1992 now abandoned (Associatron).

These prior techniques however have the following problems. Techniques of B1, B2, B3 and B5 have insufficient associative function because of being a system with a single layer. In technique B3 learning is not taken into consideration; therefore, it can not adapt to changes in environment, which is one of features of a neural network. The B1 technique of requires an electric synchronous circuit which prevents an input from being processed as an intact image (as an optical pattern), because it is combined with an AO element. The technique of B4 also requires some processing by an electric circuit.

SUMMARY OF THE INVENTION

In view of the drawbacks with the prior art, it is an object of the present invention to provide a multilayered optical neural network system capable of optically implementing two-dimensional data transfers and computations without use of a hologram and an electric circuit.

To achieve the above object, a multilayered optical neural network system according to the present invention, as shown by example in FIG. 1, comprises an input layer (including a pattern input device 8); an output layer (including an output function computing device 34); at least one hidden layer (including an output function computing device 28) provided between the input layer and the output layer; memory matrix holding means (memory matrix holding devices 18, 22) provided between respective layers for holding the weight applied to coupling between layers; correlation computing means (correlation computing devices 24, 31) for optically implementing correlation computation between an output light pattern from the previous layer and a memory matrix pattern; output function computing means (output function computing devices 28, 34) for optically computing an output function with respect to a result of the correlation computation as an output to the next stage; and memory matrix correcting means (memory matrix correcting devices 38, 42) provided between layers for optically correcting by learning a memory matrix held by said memory matrix holding means.

In accordance with one aspect of the present invention, a multilayered neural network system (for example, three layers in FIG. 2) composed of an input layer, a hidden layer, and an output layer as illustrated in FIG. 2 is constructed using an all optical type architecture without a hologram in which data transfers and computations are implemented wholly optically and in two-dimension. A learning mechanism, that constitutes an essential part of a neural network, is operable with interlayer feedback construction indispensable to a multilayered learning system, and is realized by optical computing. A multilayered computing mechanism can execute a large volume of computing volume which can not be processed by a single-layered network. As illustrated in FIG. 3, in a simple four-layered optical neural network system, the number of layers can be arbitrarily structured depending upon objects to be processed.

A neural network system of this type, which constructs a network based upon error back propagation that is adapted to feed back an erroneous output result to an input side and repeatedly weigh an input signal on the basis of the fed-back error signal for obtaining a correct output, has as a characteristic feature simplified computations such as product and sum operations and output function computations, etc., that are excellently uniform and congenial to optical computing, enabling association and recognition computations. The present invention constructs a multilayered neural network system that assures flexible computing in an all optical system using a highly parallel optical computing architecture so that computation times for learning and recalling can be shortened.

In another aspect of the present invention, particularly in the case where layers, that are separated by one or more other layers, are coupled to each other as illustrated in FIG. 4 (between an input layer and an output layer in the figure), a complicated multilayered (three layers in the figure) optical neural network system can be structured to further increase the amount of computing.

In another aspect of the present invention, the memory matrix correcting means can correct a memory matrix by optical means on the basis of signals fed from later layer memory matrix holding means (22) or the output function operating means (28), said output function differential operation means (36 or 37) for differentiating an output from said correlation operation means, and later layer correction signal holding means (memory matrix correcting device 38 or target pattern input device 13) as illustrated in FIG. 1.

In still another aspect of the present invention, said output function differential operating means is constructed with a microchannel spatial light modulator tube, mirrors, and wave plates for interlayer feedback (output differential function in particular) by optical computing with a simplified architecture.

In still another aspect of the present invention, said simple three-layered optical neural network system with a basic architecture illustrated in FIG. 4 comprises, as illustrated in FIG. 5, a multiple imaging system 10 for multiplexing and imaging an input pattern x; and input pattern converting device 12 for holding an image multiplexed and imaged; a multiple imaging system 14 for multiplexing and imaging a target pattern t, a target pattern converting device 16 for holding an image multiplexed and imaged; a first memory matrix holding device 18 for holding a memory matrix $w_{01}$ corresponding to a correlation between the input pattern x and a hidden layer output pattern u; a second memory matrix holding device 20 for holding a memory matrix $w_{02}$ corresponding to a correlation between the input pattern x and an recalling output pattern y; a third memory matrix holding device 22 for holding a memory matrix $w_{12}$ corresponding to a correlation between the hidden layer output pattern u and the recalling output pattern y; first correlation operating means 24 for optically computing a Hadamard product between images held in the input pattern converting device and the first memory matrix holding device by reading out those images in succession; a local imaging system 26 for locally imaging an image formed by the first correlation operating means for optical computing the partial sum; a first output function operating device 28 for optically computing an output function for an image locally imaged to obtain the hidden layer output pattern u, second correlation operating means 30 for optically computing a Hadamard product between images held in the input pattern converting device and the second memory matrix holding device by reading those images in succession; third correlation operating means 31 for optically computing a Hadamard product between images held in the first output function operating device and the third memory matrix holding device by reading out those images in succession; a local imaging system 32 for locally imaging images formed by the second and third correlation operating means to optically compute the partial sum between those images; a second output function operating device 34 for optically computing an output function with respect to an image locally imaged to recall the output pattern y; an output function differential operating device 36 for optically differentiating the output function; first memory matrix correcting means 38 for learning a correlation between the hidden layer and the output layer to correct the memory matrix $w_{12}$ held in the third memory matrix holding device using the images held in the first and second output function operating devices, the output function differential operating device, and the target pattern converting device; second memory matrix correcting means 40 for learning a correlation between the input layer and the output layer to correct the memory matrix $w_{02}$ held in the second memory matrix holding device using the images held in the target pattern converting device, the second output function operating device, the output function differential operating device, and the input pattern converting device; and third memory matrix correcting means 42 for learning a correlation between the input layer and the hidden layer to correct the memory matrix $w_{01}$ held in the first memory matrix holding device using the images held in the input pattern converting device, the second output function operating device, the output function differential operating device, the target pattern converting device, and the third memory matrix holding device.

Operation of the memory matrix correcting means 38 in FIG. 5 is described herein. This corresponds to the portion to correct W12 in FIG. 2 although not appearing in the same figure. Further, in FIG. 4, this corresponds to portions to calculate (t −y) f' (net 2) and ΔW12. How to realize this is actually illustrated in FIG. 16 (page 24, line 13 and thereafter). "Multi-imaging" and "local-imaging", etc., are described in U.S. Pat. No. 203,909 and U.S. Pat. No. 204,350 in detail. The basic computing of the neural network is realized by superimposing the two-dimensional patterns (multiplication of transmittances).

In another aspect of the present invention, the first memory matrix correcting means 38 comprises first multiplication means for optically implementing multiplication of transmittances of the images held in the first output function operating device, the output function differential operating device, and the target pattern converting device by reading out those images in succession; addition means for adding a result of the multiplication by the first multiplication means to the image held in the third memory matrix holding device; second multiplication means for optically implementing multiplication of transmittances of the images held in the first and second output function operating devices and the output function differential operating device by reading those images in succession; and subtraction means for subtracting a result of the multiplication by the second multiplication means from the image held in the third memory matrix holding device.

In another aspect of the present invention, the second memory matrix correcting means 40 comprises first multiplication means for optically implementing multiplication of transmittances of the images held in the target pattern converting device, the output function differential operating device, and the input pattern converting device by reading those images in succession; addition means for adding a result of the multiplication by the first multiplication means to the image held in the second memory matrix holding device; second multiplication means for optically implementing multiplication of transmittances of the images held in the first output function operating device, the output function differential operating device, and the input pattern converting device by reading those images in succession; and subtraction means for subtracting a result of the multiplication by the second multiplication means from the image held in the second memory matrix holding device.

In still another aspect of the present invention, the third memory matrix correcting means 42 comprises first multiplication means for optically implementing multiplication of transmittances of the images held in the target pattern converting device and the output function differential operating device by reading out those images in succession; second multiplication means for optically implementing multiplication of transmittances of the images held in the second output function operating device and the output function differential operating device by reading those images in succession; an operation result holding device for holding results yielded by adding successive outputs from the first multiplication means and then subtracting therefrom successive outputs from the second multiplication means; fourth correlation operating means for optically implementing a Hadamard product between the images held in the operation results holding device and the third memory matrix holding device by reading out those images in succession; a local imaging system for locally imaging an image formed by the fourth correlation operating means to optically compute the partial sum; a partial sum holding device for holding the partial sum formed by the local imaging system; fifth correlation operating means for optically implementing a Hadamard product among the images held in the partial sum holding device, the input pattern converting device, and the output function differential operating device by reading out those images in succession; and addition/subtraction means for adding/subtracting a result of the operation by the fifth correlation operating means to/from the image held in the first memory matrix holding device.

In another aspect of the present invention, the addition/subtraction means is adapted to separate the addition and the subtraction to first add a positive fraction of the operation result to the image and then subtract a negative fraction of the operation result from the image.

BRIEF DESCRIPTION OF THE DRAWINGS

The preferred embodiments will be described with reference to the drawing, wherein like elements have been denoted throughout the figures with like reference numerals, and wherein:

FIGS. 16 and 17 are views of optical paths each illustrating the operation of the learning operation 1;

FIGS. 18 and 19 are view of optical paths each illustrating the operation of the learning operation 2;

DESCRIPTION OF THE PREFERRED EMBODIMENTS

In what follows, there will be described an embodiment of the present invention that is applied to a simple three-layered neural network system in which learning is performed on the basis of back propagation, with reference to the accompanying drawings.

Figure 5A:
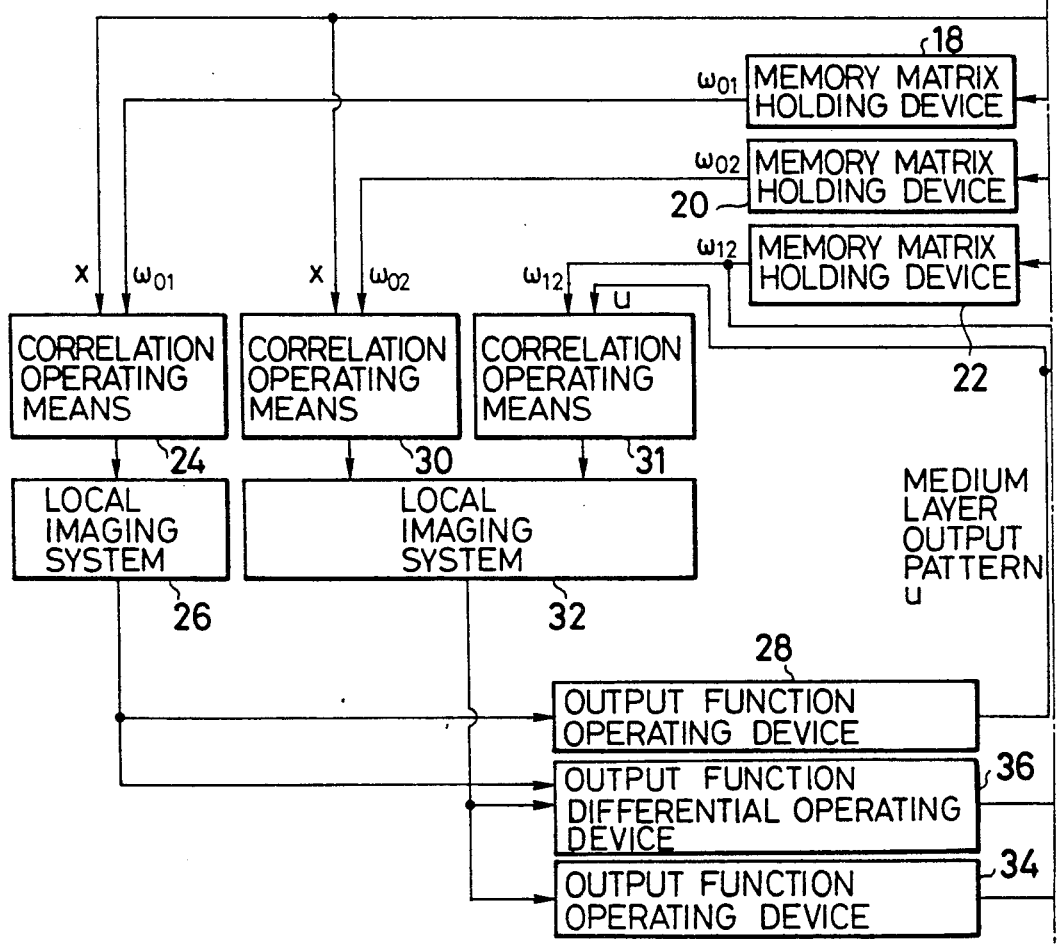
FIGS. 5A and 5B are block diagram exemplarily illustrating a concrete construction of the aforementioned simple three-layered optical network system.
Figure 5B:
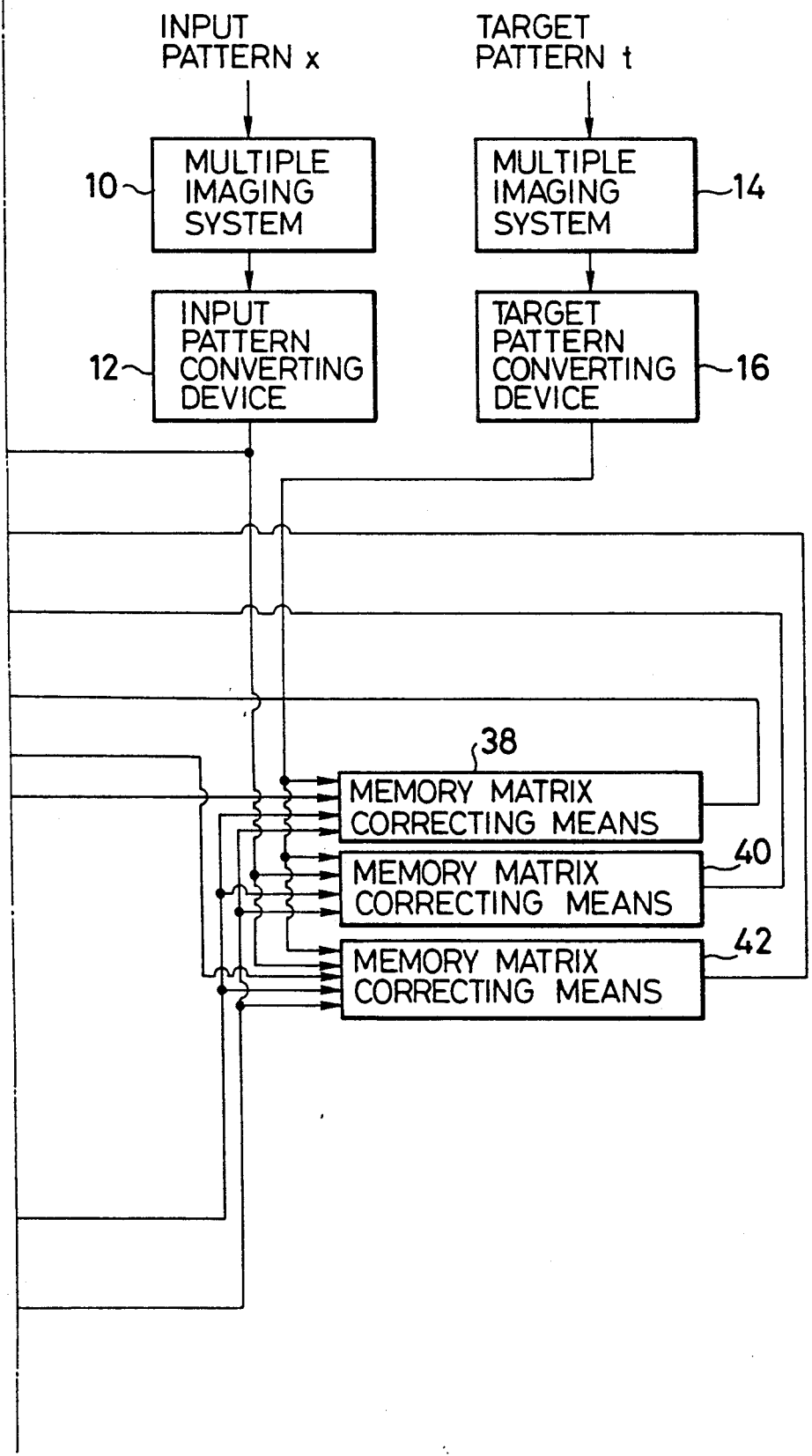
Figure 6:
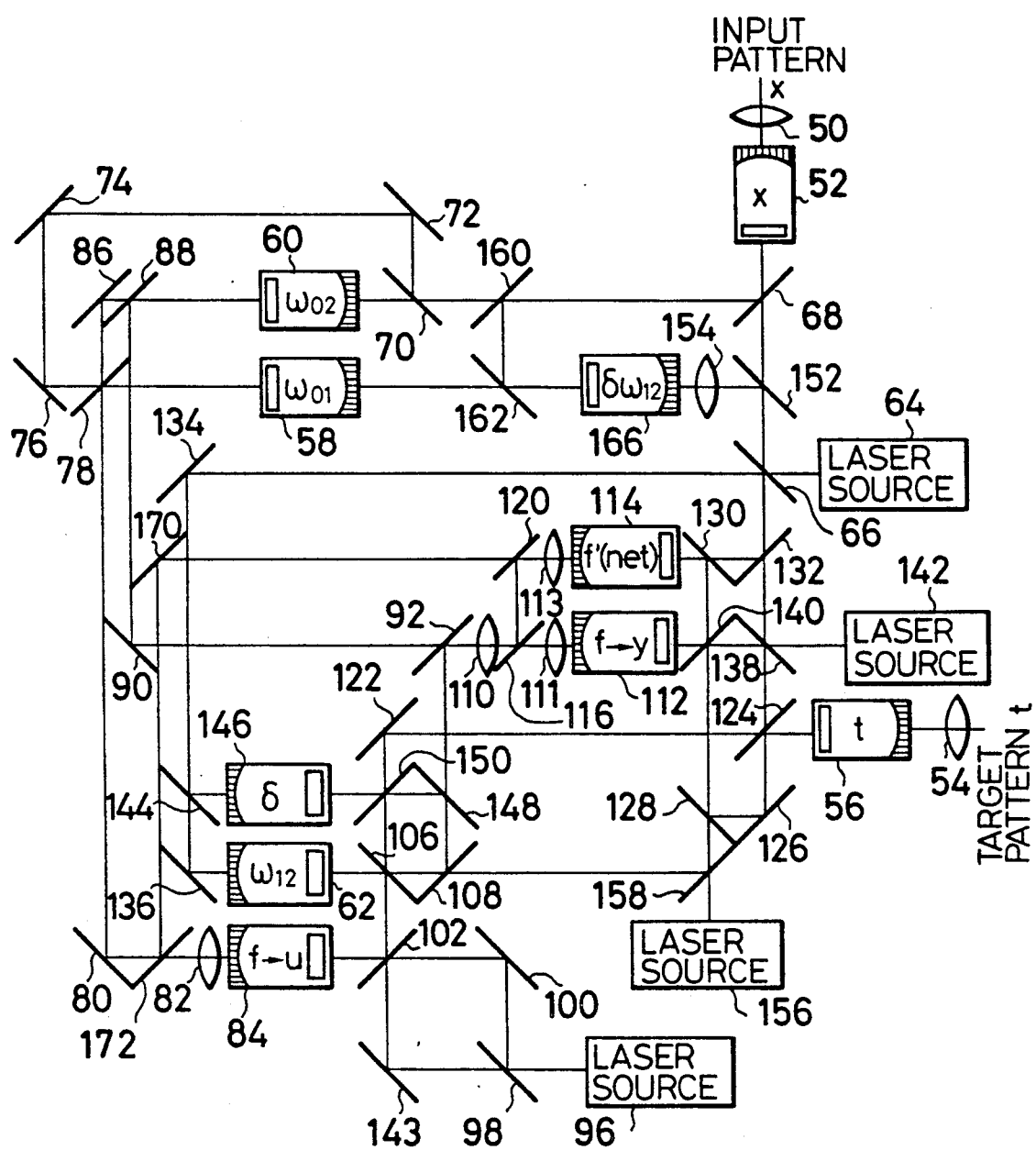
FIG. 6 is a view illustrating an optical path in the construction of an embodiment of the present invention.

The present embodiment comprises, as illustrating in FIG. 6, a lens array 50 constituting the multiple imaging system 10 shown in FIG. 5; an input pattern converting microchannel spatial light modulator (MSLM) 52 constituting the aforementioned input pattern converting device 12; a lens array 54 constituting the aforementioned multiple imaging system 14; a target pattern converting MSLM 56 constituting the aforementioned target pattern converting device 16; a memory matrix holding MSLM 58 constituting the aforementioned first memory matrix holding device 18; a memory matrix holding MSLM 60 constituting the aforementioned second memory matrix holding device 20; a memory matrix holding MSLM 62 constituting the aforementioned third memory matrix holding device 22; a laser light source 64; half mirrors 66, 68 and 70, mirrors 72, 74 and 76, a half mirror 78, and a mirror 80 all constituting together the aforementioned first correlation operating means 24; a lens array 82 constituting the aforementioned local imaging system 26; an output function operating MSLM 84 constituting the aforementioned first output function operating device 28; the laser light source 64, the half mirrors 66, 68 and 70, the mirrors 72, 74 and 78, the half mirror 78, a mirror 86, a half mirror 88, a mirror 90, and a half mirror 92 all constituting together the aforementioned second correlation operating means 30; a laser light source 96, a halfmirror 98, a mirror 100, and half mirrors 102, 106, 108 and 92 all constituting together the aforementioned third correlation operating means 31; lens arrays 110, 111 and 113 all constituting together the aforementioned local imaging system 32; an output function operating MSLM 112 constituting the aforementioned second output function operation device 34; and output function differential operating MSLM 114 constituting the aforementioned output function differential operating device; half mirrors 116 and 120 for splitting an output from the lens array 110 to the MSLMs 112 and 114; the laser source 96, the half mirror 98, the mirror 100, the half mirror 102, and a mirror 122, a half mirror 124, a mirror 126, a half mirror 128, half mirrors 130, 132 and 66, mirrors 134 and 136, and half mirrors 138 and 140 all constituting together the aforementioned first memory matrix correcting means 38; the laser light source 96, a mirror 143, and the mirror 122, the half mirror 124, the mirror 126, the half mirrors 128, 130, 132 and 68, and a laser light source 142, and the half mirror 140 all constituting together the aforementioned second memory matrix correcting means 40; and the laser light source 96, the mirrors 143 and 122, the half mirror 124, the mirror 126, the half mirror 128, the half mirrors 130, 132 and 66, the mirror 134, and a half mirror 144 and a δ operating MSLM 146, and the half mirrors 138 and 140 and the half mirrors 106, 108, 148, 150 and 152, a local imaging lens array 154, a laser light source 156, and half mirrors 158, 160 and 162, and the half mirror 68, and a partial sum holding MSLM 166, a mirror 170 and a half mirror 172 all constituting together the aforementioned third memory matrix correcting means 42.

The aforementioned first memory matrix correcting means 38 more specifically comprises the laser light source 96, the half mirror 98, the mirror 100, the half mirror 102, the mirror 122, the half mirror 124, the mirror 126, and the half mirrors 128 and 130 all constituting together first multiplication means for optically implementing multiplication of transmittance of images held by the first output function operating MSLM 84, the output function differential operating MSLM 114, and the target pattern converting MSLM 56 by successively reading out those images; the half mirrors 132 and 66, and the mirrors 134 and 136 all constituting together addition means for adding a multiplication result by the first multiplier means to an image held by the third memory matrix holding MSLM 62; the laser light source 96, the half mirror 98, the mirror 100, the half mirror 102, the mirror 122, and the half mirrors 124, 138, 140 and 130 all constituting together second multiplication means for optically implementing multiplication of transmittances of images held by the first and second output function operating MSLMs 84, 112 and the output function differential operating MSLM 114 by successively reading out those images; and the half mirrors 132 and 66, and the mirrors 134 and 136 all constituting together subtraction means for subtracting a multiplication result by the second multiplier means from an image held by the third memory matrix holding MSLM 62.

The aforementioned second memory matrix correcting means 40 more specifically comprises the laser light source 96, the half mirrors 143, 122, the half mirror 124, the mirror 126, and the half mirrors 128, 130 and 132 all constituting together first multiplication means for optically implementing multiplication of transmittances of images held by the target pattern converting MSLM 56, the output function differential operating MSLM 114, and the input pattern converting MSLM 52 by successively reading out those images; the half mirror 68 constituting addition means for adding a multiplication result by the first multiplication means to an image held by the second memory matrix holding MSLM 60; the laser light source 142, and the half mirrors 140, 130 and 132 all constituting together second multiplication means for optically implementing multiplication of transmittances of images held by the first output function operating MSLM 112, the output function differential operating MSLM 114, and the input pattern converting MSLM 52 by successively reading out those images; and the half mirror 68 constituting subtraction means for subtracting a multiplication result by the second multiplication means from an image held by the second memory matrix holding MSLM 60.

The aforementioned third memory matrix correcting means 42 more specifically comprises the laser light source 96, the mirrors 143, 122, the half mirror 124, the mirror 126, and the half mirrors 128, 130 all constituting together first multiplication means for optically implementing multiplication of transmittances of images in the target pattern converting MSLM 56 and the output function differential operating MSLM 112 by successively reading those images; the laser light source 96, the mirrors 143, 122, and the half mirrors 124, 138, 140 and 130 all constituting together second multiplication means for optically implementing multiplication of transmittances of images held by the second output function operating MSLM 112 and the output function differential operating MSLM 114 by successively reading out those images; a δ operating MSLM 146 for holding a result δ yielded by adding an output from the first multiplication means that is input thereinto through the half mirrors 130, 132 and 66, the mirror 134, and the half mirror 144 and subtracting an output from the second multiplication means all constituting together an operation result holding device; the laser light source 96, the mirror 143, and the half mirrors 106, 108, 148 and 150 all constituting together fourth correlation operating means for optically implementing a Hadamard product of images held by the δ operating MSLM 146 and the third memory matrix holding MSLM 62 by successively reading those images; the lens array 154 constituting the local imaging system for locally imaging an image formed by the fourth correlation operating means and input thereinto via the half mirror 150, the mirror 122, and the half mirrors 124, 152 to optically implement partial sum of the image locally imaged; the partial sum holding MSLM 166 for holding the partial sum formed by the lens array 154; the laser light source 156, and the half mirrors 130, 132, 68, 160, and 162 all constituting together fifth correlation operating means for optically computing a Hadamard product of images held by the partial sum holding MSLM 166, the input pattern converting MSLM 52, and the output function differential operating MSLM 122 by successively reading those images; and the half mirror 162 constituting addition/subtraction means for adding or subtracting a multiplication result by the fifth correlation operating means to or from an image held by the first memory matrix holding MSLM 58.

Figure 7:
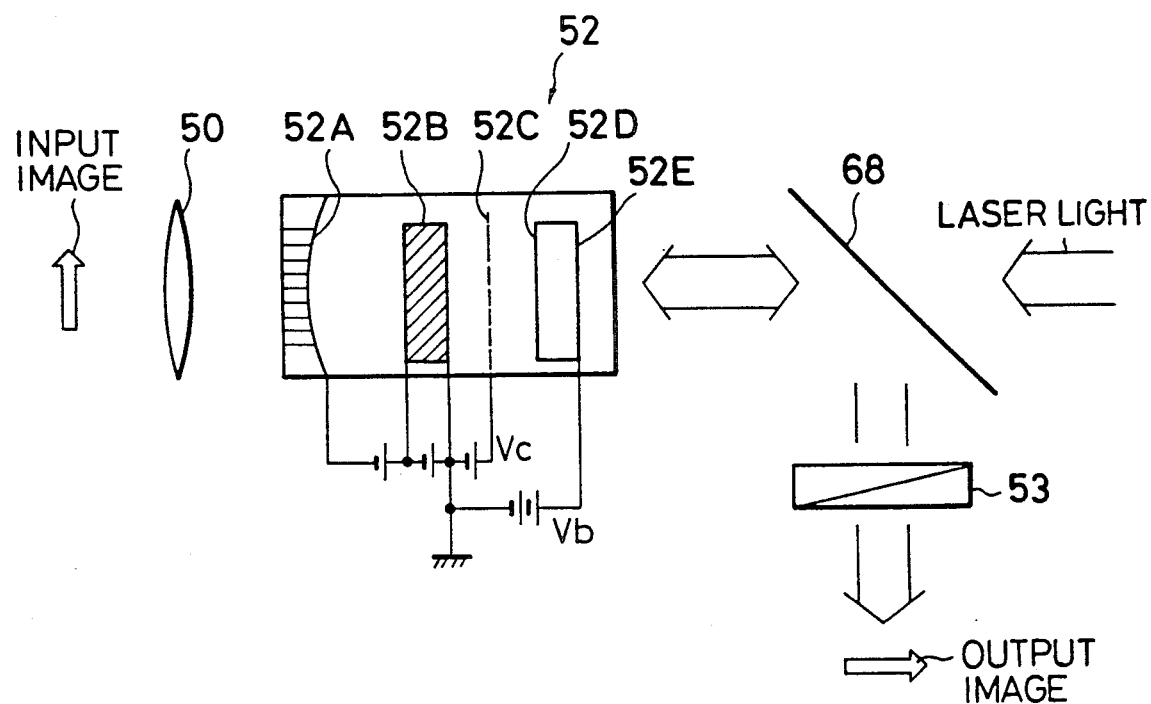
FIG. 7 is a crosssectional view illustrating the basic construction of a microchannel spatial light modulator used in the embodiment of FIG. 6.

The aforementioned MSLMs 52, 56, 58, 60, 62, 84, 112, 114, 146 and 166 comprise, as illustrated in FIG. 7 for example, a photocathode 52A for converting an input image incident thereupon via a lens (for example 50) to a photoelectric image; a microchannel plate (MCP) 52B for multiplying the photoelectric image emitted from the photocathode 52A; a mesh electrode 52C for accelerating photoelectrons multiplied by the MCP 52B; and an electrooptic crystal 52E where an electric charge pattern is formed on an electric charge storage surface 52D located on the left side in the figure by electrons passing through the mesh electrode 52C.

In the MSLM (for example 52), the electric charge pattern is formed on the electric charge storage surface 52D of the electrooptic crystal 52E in response to the input image, in response to which pattern an electric field traversing the electrooptic crystal 52E is changed to cause the refractive index of the electrooptic crystal 52E to be changed owing to the Pockels effects. Accordingly, when the electrooptic crystal 52E is irradiated with linearly polarized laser light from the right side in the figure, reflected light from the electric charge storage surface 52D has been changed in its polarization state owing to double refraction of the electrooptic crystal 52E. Therefore, once the reflected light is transmitted through an analyzer 53, an output image having light intensity corresponding to the input image is yielded. Herein, although no polarizing plate is illustrated in FIG. 6 for simplifying the figure, there is actually provided one polarizing plate corresponding to one MSLM.

The MSLM manifests excellent functions in addition to an incoherent to coherent light converting function and a memory function, an addition/subtraction function, a real time thresholding function, and an AND operation function, etc., which are made operable by controlling electric charges under proper condition. Optical associative memory devices utilizing such functions are disclosed in Japanese Laid-Open Patent Publications Nos. 63-367437 and 64-78491.

The MSLMs and lens arrays can be used to execute the following basic operations in optical computing.

(1) MULTIPLICATION

Multiplication of transmittances of images held by the MSLMs can be implemented by successively reading those images using two or more of the MSLMs and corresponding polarizing plates.

(2) ADDITION AND SUBTRACTION

Two-dimensional addition and subtraction can be implemented by setting voltages applied to the MSLMs.

(3) Partial Sum Operation

Sum can be realized by focusing light through a lens. Partial sum can therefore be implemented using a multi-lens array or a diffraction grating.

(4) OUTPUT FUNCTION OPERATION

Figure 8:
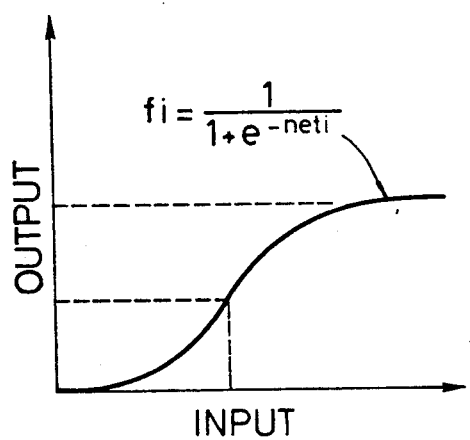
FIGS. 8 and 9 are diagrams each exemplarily illustrating an output function used in the embodiment of FIG. 6.
Figure 9:
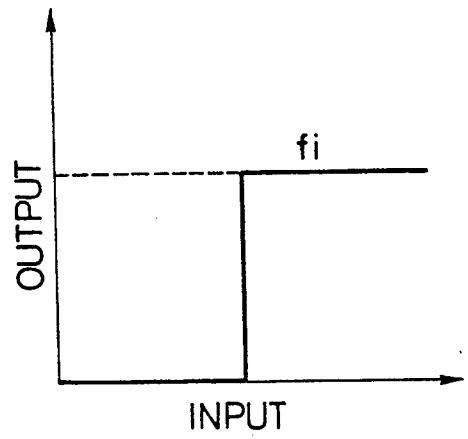

The output function includes a sigmoid function as illustrated in FIG. 8 and a threshold function as illustrated in FIG. 9, and other functions. MSLMs enable thresholding therein. Additionally, the input/output characteristic of the MSLM when used in a normal mode exhibits $\sin^2\theta$ which can also be used as an output function. Further, MSLMs can assure arbitrary functions based upon $\sin^2\theta$ by controlling voltage applied thereto.

(5) DIFFERENTIATION OF OUTPUT FUNCTION

DIfferentiation f'(net) on the output function in the back propagation (refer to FIG. 10) can be realized as follows for example.

EXAMPLE NO. 1

A relationship: output=$\sin^2$ (input) is utilized.

Figure 10:
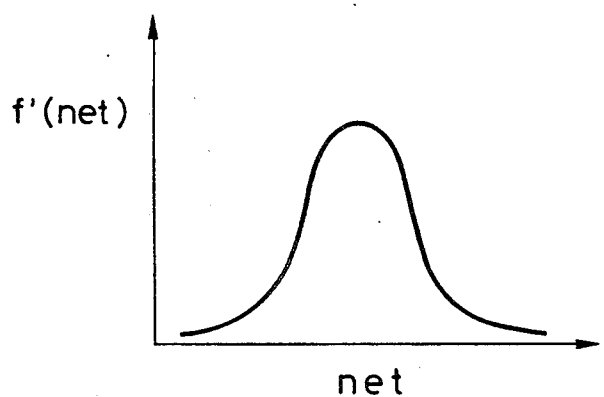
FIG. 10 is a diagram exemplarily illustrating the differentiated waveform of the output function.

Use of the MSLM is a normal mode presents a $\sin^2$ curve as the input/output characteristic thereof. This leads to an input/output relationship such as illustrated in FIG. 10 by setting application voltage to the MSLM such that $\theta$ is $\pi$.

EXAMPLE NO. 2

An expression: output=input (1−input) is employed.

Figure 11:
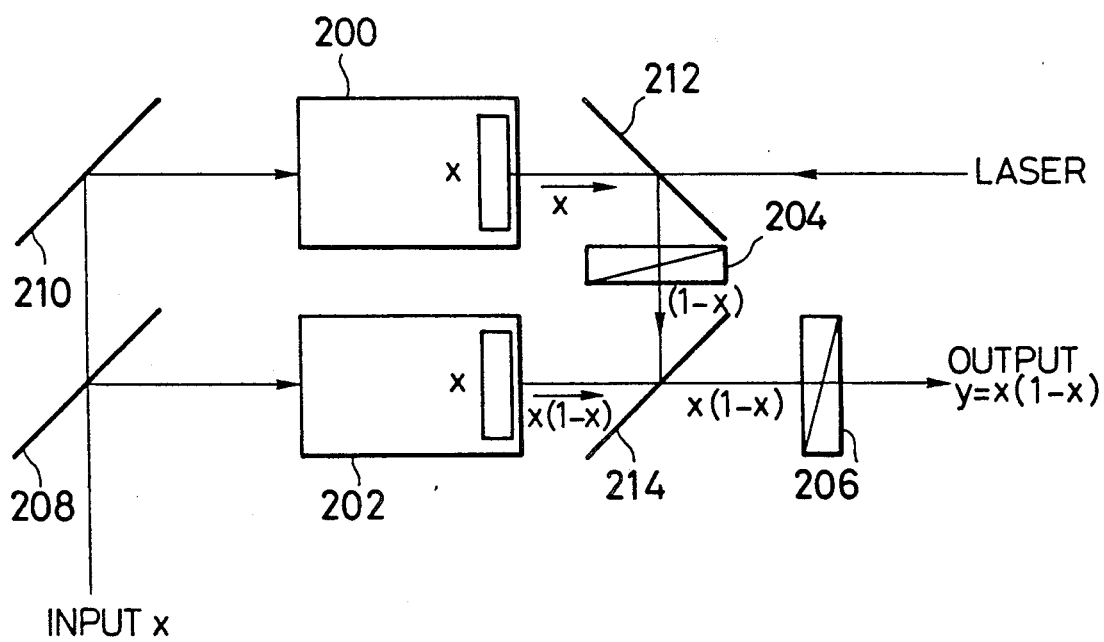
FIGS. 11 and 12 are diagrams each exemplarily illustrating an optical system implementing the differential operation of the output function.

The expression is realizable with an optical system composed of two MSLMs 200, 202, two polarizing plate 204, 206 with polarization directions perpendicular to each other, and half mirrors 208, 210, 212 and 214, as illustrated in FIG. 11 for example. More specifically, in the case where an input x has been written in the MSLM, as the polarizing plate is rotated 90°, a light and darkness pattern is reversed to take out a pattern (1−x). Therefore, successive read out of (1−x) and x using a laser establishes operation of the following equation:

$$y = x(1-x)$$

where y is an output.

Figure 12:
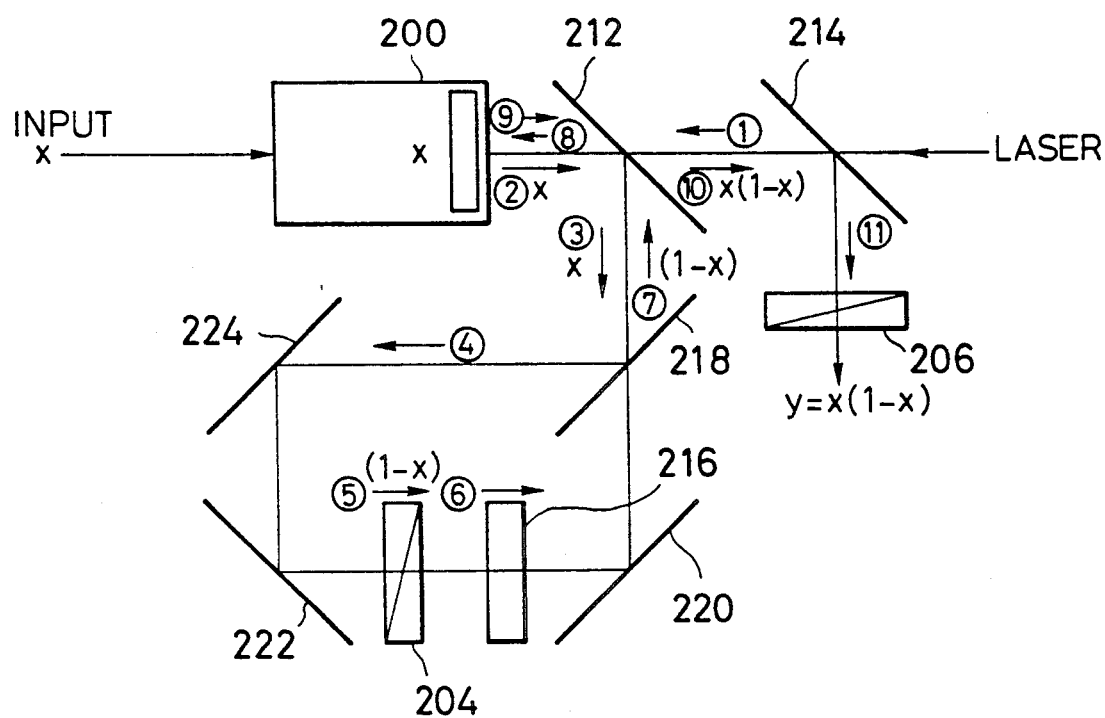

Moreover, an optical system to realize the above equation is also achievable as illustrated in FIG. 12, using an MSLM 200, two polarizing plates 204 (with a polarization direction horizontal with respect to a laser) and 206 (with a polarization direction vertical with respect to the laser), a halfwave plate 216, half mirrors 212, 214 and 218, and mirrors 220, 222, and 224. In operation, at ① signal fraction 1 of flat light from the laser enters the optical system and at ② a signal x written in the MSLM 200 is read out. The signal x so read out is reflected at ③ the half mirror 212 and at ④ the half mirror 218, and further reflected on the mirrors 224 and 222. Thereafter, at ⑤ a (1−x) fraction is taken out as the intensity through the polarizing plate 204, and at ⑥ the polarization direction is rotated 90° by the half wave plate 216. Further, the signal (1−x) is reflected at ⑦ on the mirror 220 and at ⑧ on the half mirror 212 to be incident upon the MSLM 200. Furthermore, at ⑨ the signal in the MSLM 200 is again read out and at ⑩ the computation x (1−x) is implemented at ⑪ the result is reflected on the half mirror 214 and thereafter taken out through the polarizing plate 206.

In the following, operation of the embodiment will be described.

It is now assumed that the input pattern is x, a hidden layer output pattern u, a recalling output pattern y, and a target pattern t. A learning pattern is expressed by a pair (x, t). A memory matrix is prepared by learning a plurality of sets of the learning patterns $(x_2, t_1)$, $(x_2, t_2)$, ..., $(x_n, t_n)$. When an input x' is input upon recalling, an output $t_0$ corresponds to a strongly correlated pattern among the learned patterns $x_1 \ldots x_n$ can be associated.

The operation largely comprises five groups as will be described in succession.

Figure 1:
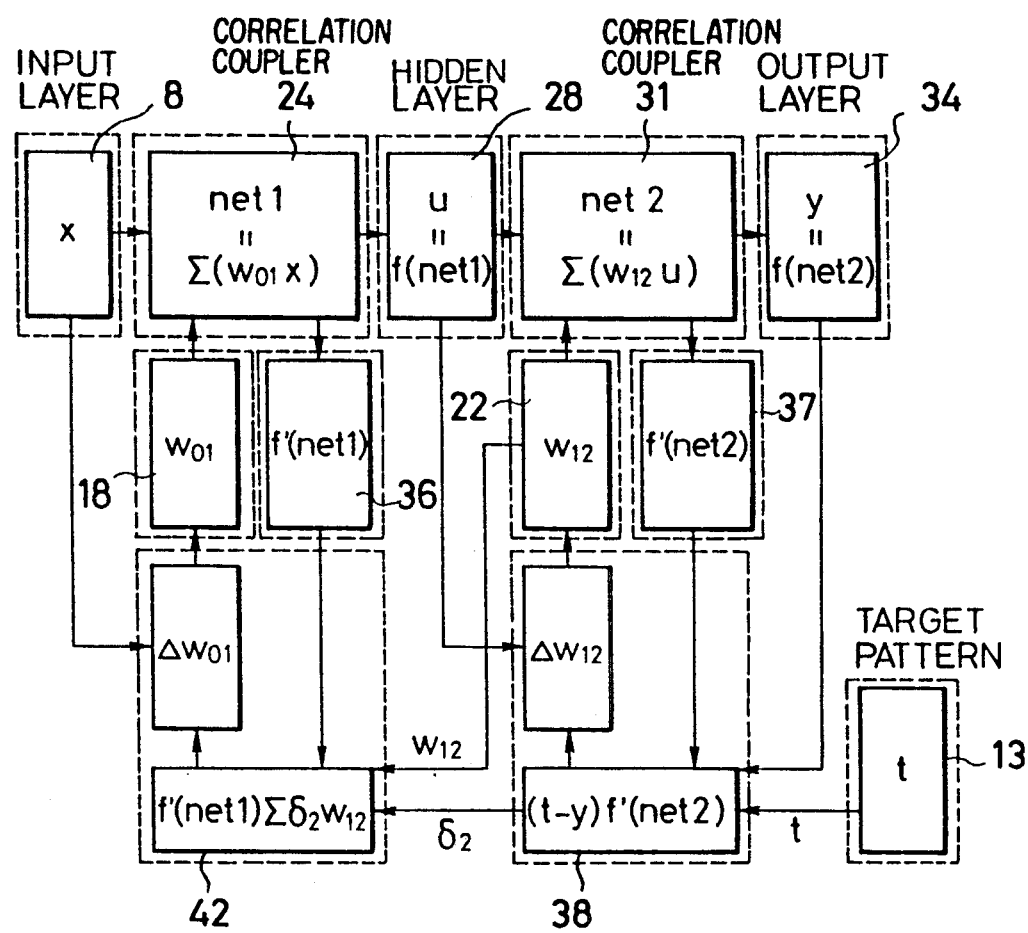
FIG. 1 is a block diagram illustrating the basic construction of a simple three-layered optical neural network system according to the present invention.
Figure 2:
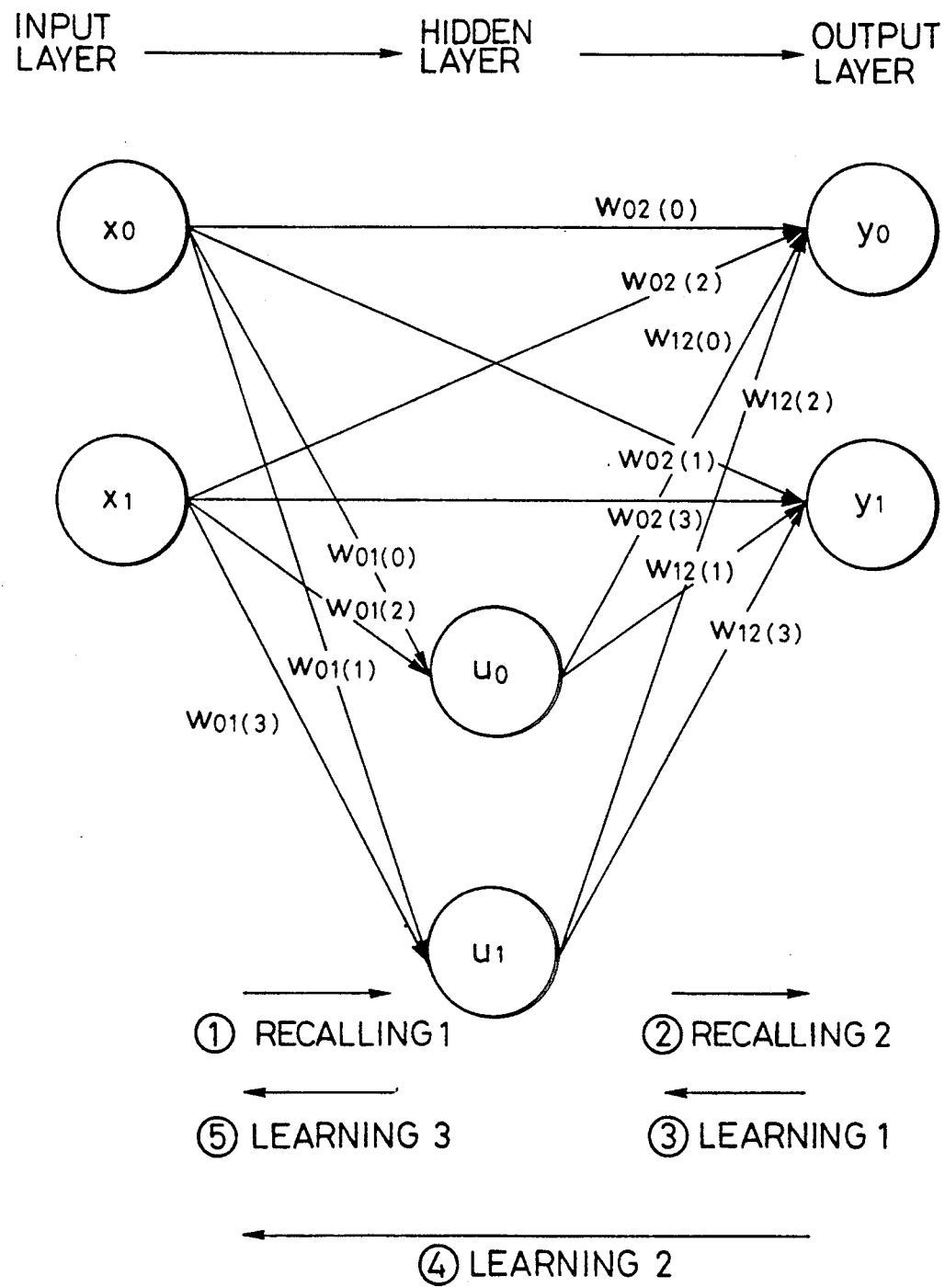
FIG. 2 is a block diagram illustrating the basic construction of a multilayered network system.

① Recall Operation of the Hidden Layer Output u (Recalling Operation in FIG. 2)

The Recall Operation 1 is realized using the following equation:

$$u = f(\Sigma W_{01} \cdot X) \quad (1)$$

where f is the output function, $\Sigma$ is the partial sum, $w_{01}$ is a memory matrix held by the first memory matrix holding MSLM 58, and x is the input pattern.

Figure 13:
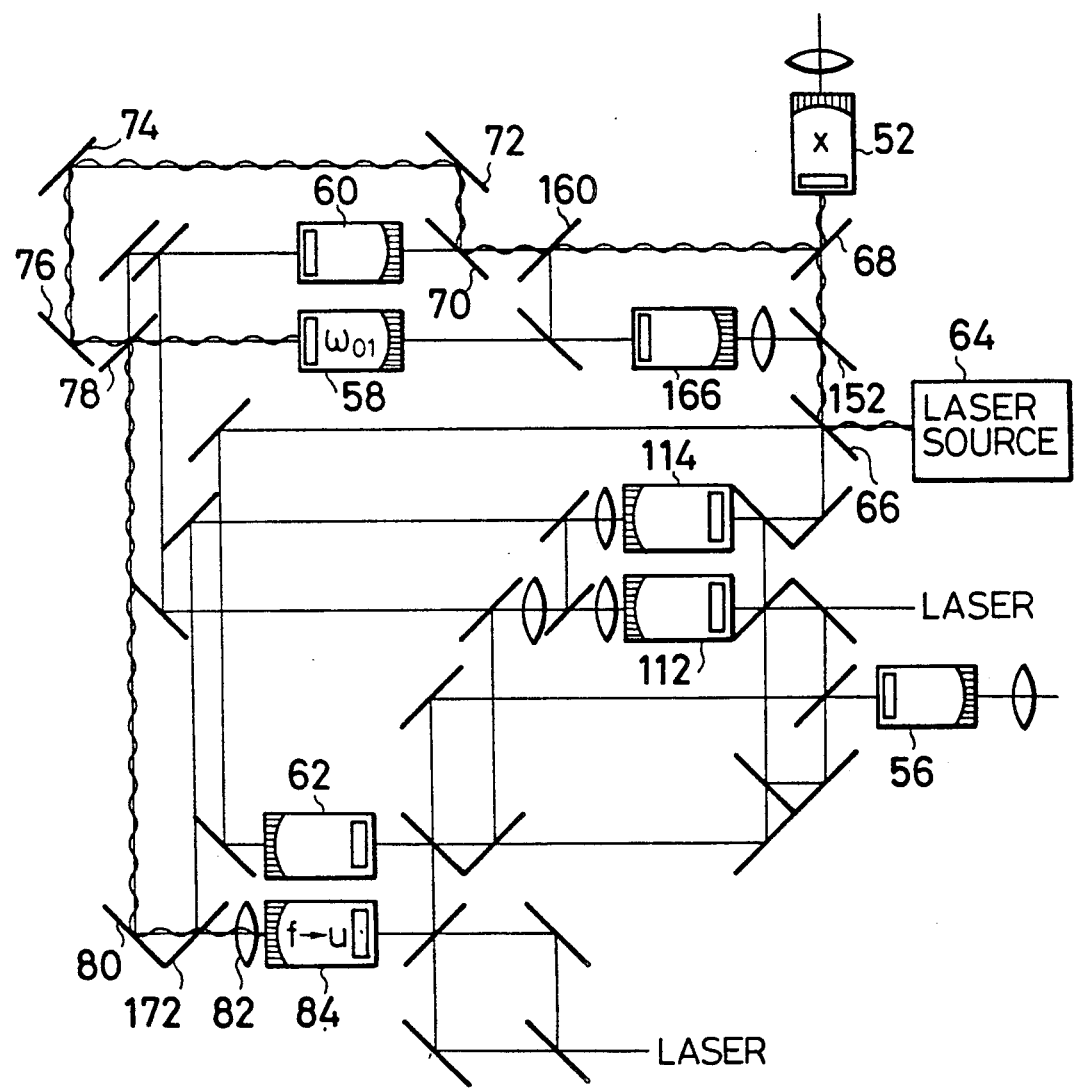
FIG. 13 is a view of an optical path illustrating the operation of the recall operation 1 in the aforementioned embodiment.

As illustrated in FIG. 13, images x, $w_{01}$ held by the input pattern converting MSLM 52 and the first memory matrix holding MSLM 58 are successively read by laser light emitted from the laser light source 64 to implement a two-dimensional pointwise Hadamard product (multiplication of transmittances) $w_{01} \cdot x$. A result of the multiplication is subjected to the partial sum $\Sigma$ by the lens array 82 located on the entrance side of the first output function operating MSLM 84, and the multiplication result is further subjected to the output function f operation in the output function operating MSLM 84 to yield the hidden layer output pattern u ② Recall Operation of the output y (Recall Operation 2 in FIG. 2)

The Recall Operation 2 is realized urging the following equation:

$$y = f(\Sigma W_{02} \cdot X + \Sigma W_{12} \cdot u) \quad (2)$$

where $w_{02}$ is a memory matrix held by the second memory matrix holding MSLM 60 and $w_{12}$ is a memory matrix held by the third memory matrix holding MSLM 62.

For the Recall Operation 2 optical computing is implemented separately for the right side first term and for the right side second term of the equation (2).

Figure 14:
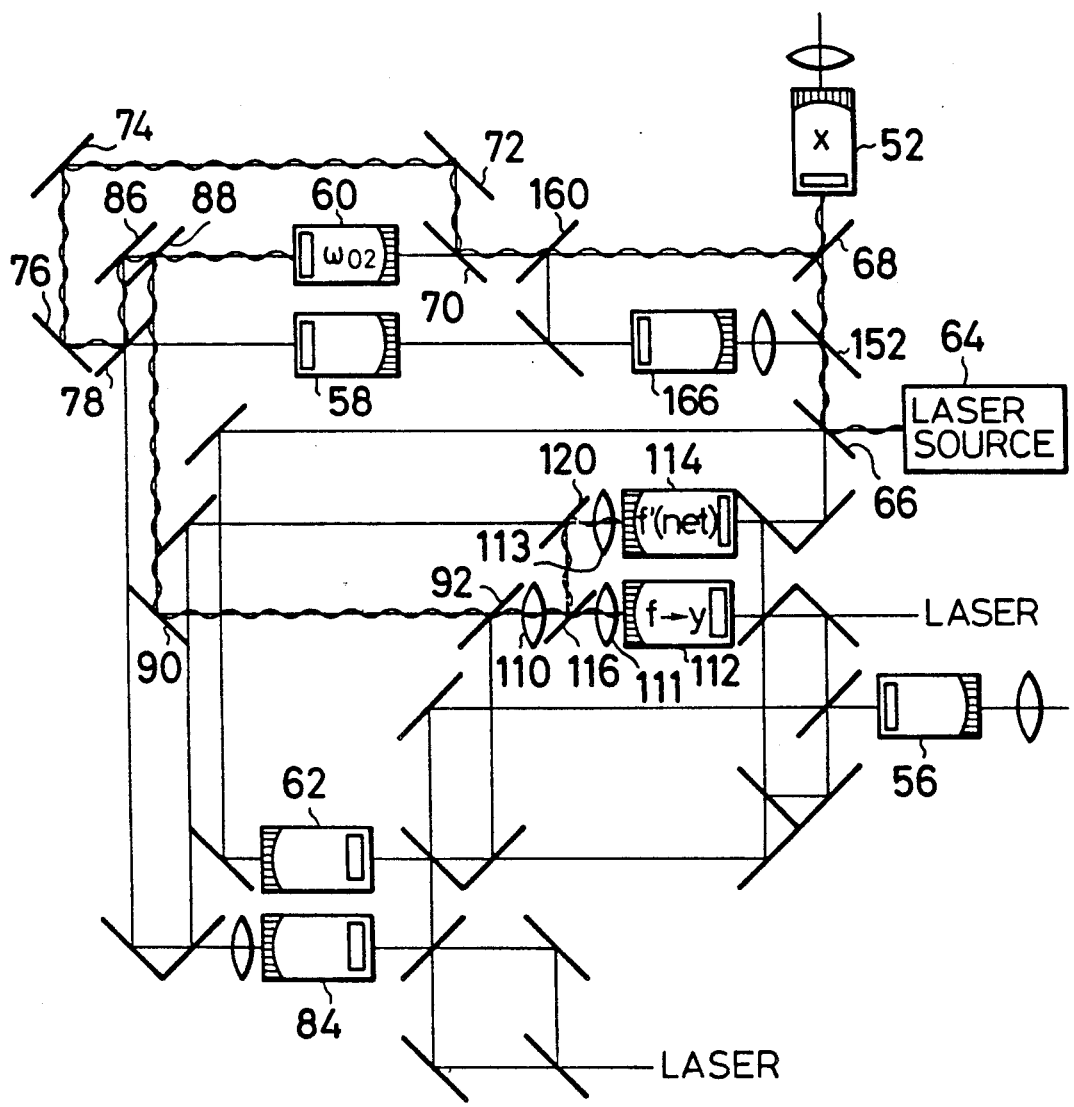
FIGS. 14 and 15 are views of optical paths each illustrating the operation of the recall operation 2.

More specifically, as illustrated in FIG. 14, images x, $w_{02}$ held in the input pattern converting MSLM 52 and the second memory matrix holing MSLM 60 are successively read out by the laser light emitted from the laser light source 64 to compute $w_{02} \cdot x$. A result of the multiplication reaches the second output function operating MSLM 112 through the partial sum operating lens array 110.

Figure 15:
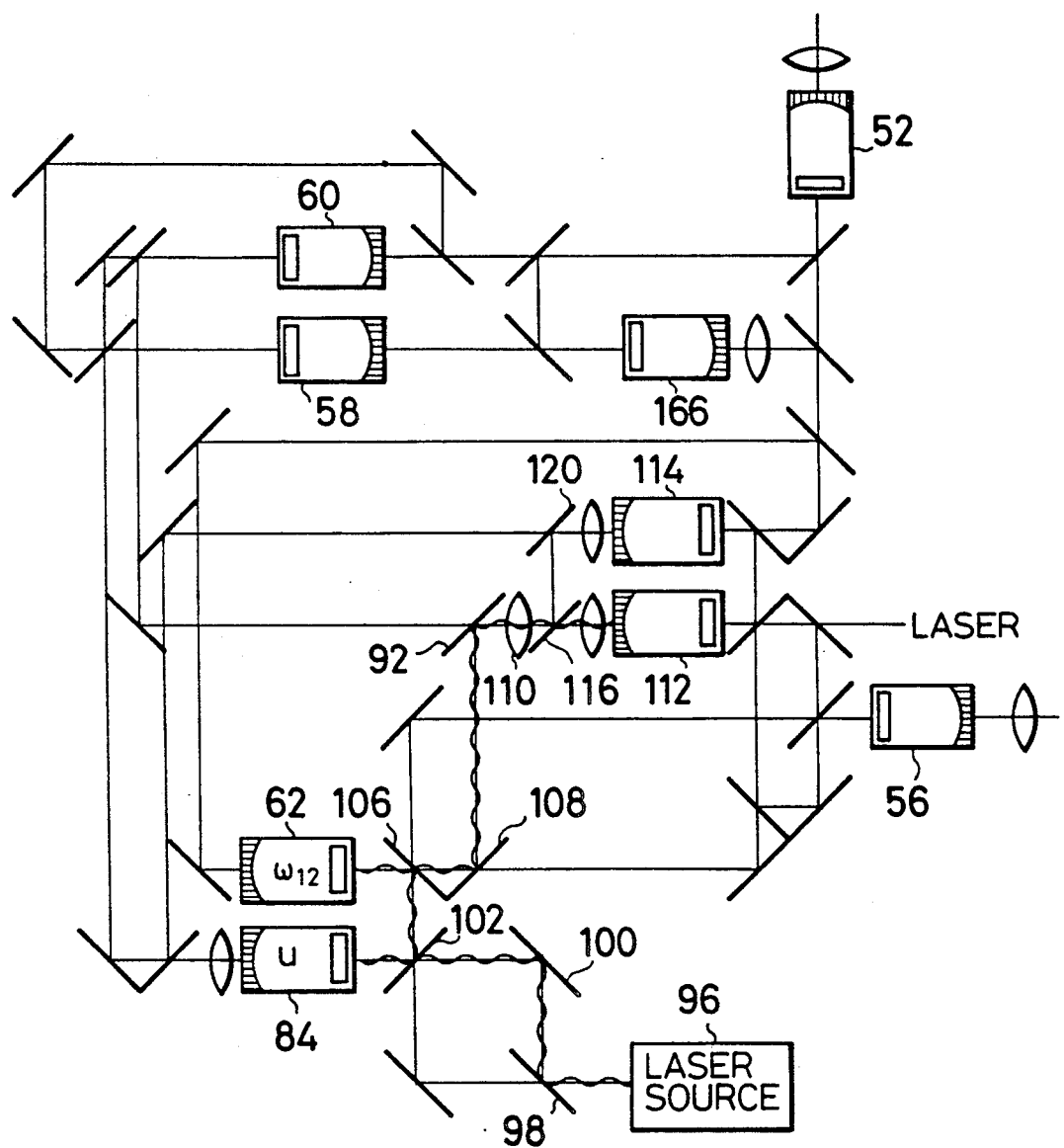

In succession, as illustrated in FIG. 15, images u, $w_{12}$ held in the first output function operating MSLM 84 and the third memory matrix holding MSLM 63 are successively read out by laser light emitted from the laser light source 96 to compute $w_{12} \cdot u$. A result of the multiplication reaches the second output function operating MSLM 112 through the partial sum operating lens array 110.

Thus, the operation in the parenthesis of the right side is realized. More specifically, the partial sum $\Sigma$ is implemented by the lens array 110 and applied to the output function $f$ by the second output function operating MSLM 112 to yield the recalling output pattern y.

Herein, the partial sum "net 2" of the signal to the output layer is stored in the output function differential operation MSLM 114 as indicated by a broken line in FIG. 14 for use in learning.

③ Learning Operation of Hidden Layer—Output Layer (Learning Operation 1 in FIG. 2).

The Learning Operation 1 is used to correct the memory matrix $w_{12}$ held in the third memory matrix holding MSLM 62 as expressed by the following equation:

$$W_{12}(n+1) = W_{12}(n) + \Delta W_{12} \quad (3)$$

Herein, n denotes the number of iteration of the learning and $\Delta w_{12}$ is a correction term which is expressed by the following equation:

$$\Delta W_{12} = \eta \delta_2 u = \eta\{(t-y)f'(\text{net } 2)\}u = \eta_1 \cdot t \cdot f'(\text{net } 2)u - \eta_2 \cdot y \cdot f'(\text{net } 2) \cdot u \quad (4)$$

where $\eta$, $\eta_1$ and $\eta_2$ are learning gains.

The operation of the equation (4) also implemented separately for the right side first term and the right side second term.

First, as illustrated in FIG. 16, images u, t, and f'(net) held in the first output function operating MSLM 84, the target pattern converting MSLM 56, and the output function differential operating MSLM 114 are successively read out by irradiation of the laser light emitted from the laser light source 96 to realize multiplication $u \cdot t \cdot f'(\text{net } 2)$ of transmittances. A result of the operation is entered into the third memory matrix holding MSLM 62 in which the memory matrix $w_{12}$ is held to implement addition in the MSLM 62 and hence realize the right first term in the equation (4). Herein, the learning gains $\eta_1$ and $\eta_2$ are realized by controlling voltage applied to the MSLM 62 and the like.

In succession, as illustrated in FIG. 17, images u, y, and f'(net 2) held in the first output function operating MSLM 84, the second output function operating MSLM 112 and the output function differential operating MSLM 114 are successively read out by irradiation of the laser light emitted from the laser light source 96 to realize multiplication $u \cdot y \cdot f'(\text{net } 2)$ of the transmittances of those images. A result of the multiplication is entered into the memory matrix holding MSLM 62 to implement subtraction therein. Hereby, the right side second term in the formula (4) is realized and hence the equation (3) is realized.

④ Learning Operation of the Input Layer—the Output Layer (Learning Operation 2 in FIG. 2)

The Learning Operation 2 is used to correct the memory matrix $w_{02}$ held in the second memory matrix holding MSLM 60 as expressed by the following equation:

$$W_{02}(n+1) = W_{02}(n) + \Delta W_{02} \quad (5)$$

where $\Delta w_{02}$ is a correction term of the memory matrix $w_{02}$ as expressed by the following equation:

$$\Delta W_{02} = \eta \delta_2 X = \eta\{(t-y)f'(\text{net } 2)\} \cdot X = \eta_1 \cdot t \cdot f'(\text{net } 2) \cdot X - \eta_2 \cdot y \cdot f'(\text{net } 2) \cdot X \quad (6)$$

Also, the Learning Operation 2, operation is implemented separately for the right side first term and right side second term of the equation (6).

More specifically, as illustrated in FIG. 18, images t, f'(net 2), and x held in the target pattern converting MSLM 56, the output function differential operation MSLM 114, and the input pattern converting MSLM 52 are successively read out by irradiating the laser light emitted from the laser light source 96 to realize multiplication $t \cdot f'(\text{net } 2) \cdot x$ of the transmittances of the images. A result of the operation is entered into the second memory matrix holding MSLM 60 to implement addition in the MSLM 60 and hence realize a portion corresponding to the right side first term of the equation (6) in the equation (5).

Figure 19:
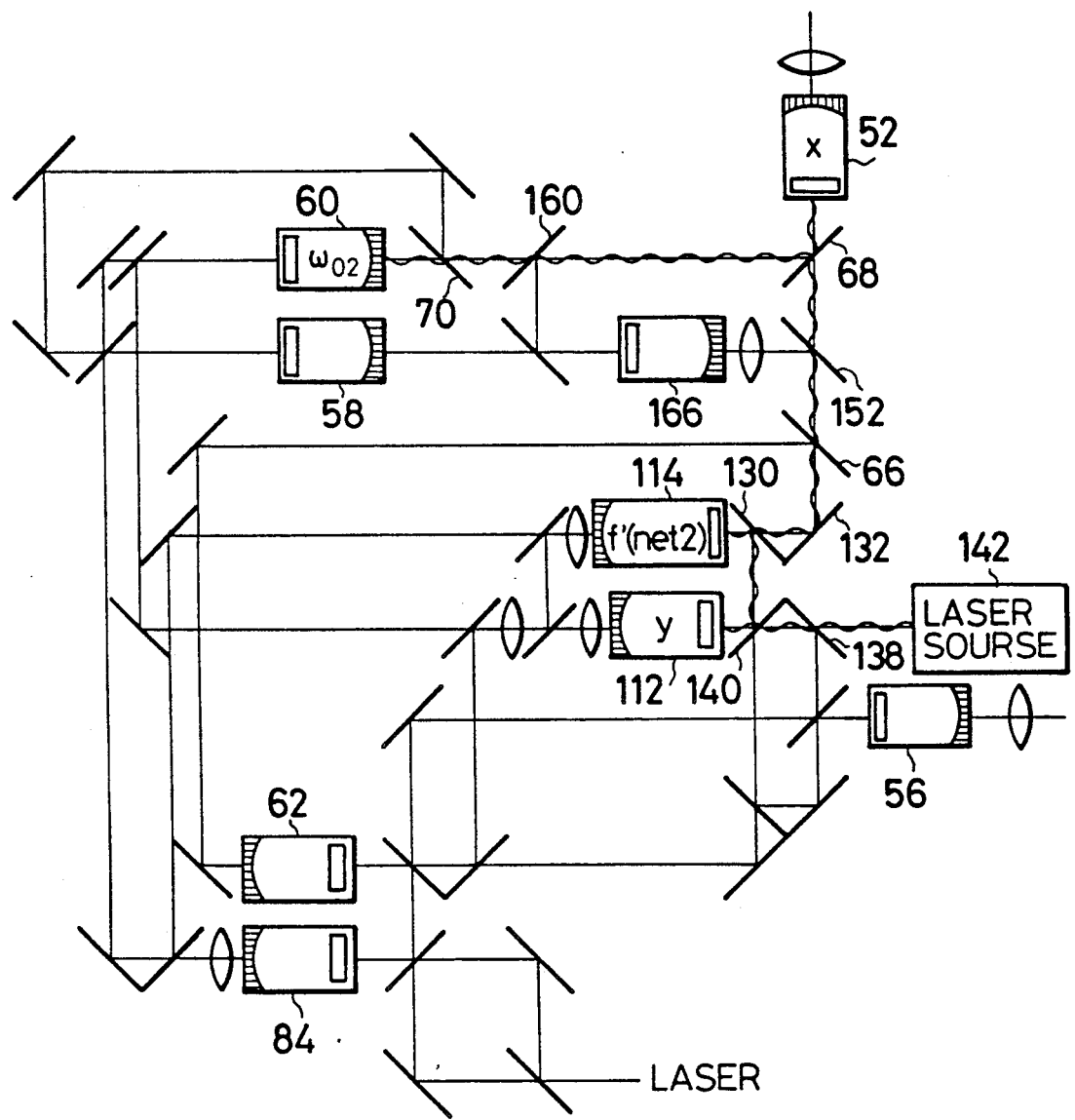

In succession, as illustrated in FIG. 19, images y, f'(net 2), and x held in the second output function operating MSLM 112, the output function differential operating MSLM 114, and the input pattern converting MSLM 52 are successively read out by irradiating those MSLMs with the laser light emitted from the laser light source 142 to realize multiplication $y \cdot f'(\text{net } 2) \cdot x$ of transmittances of those images. A result of the operation is entered into the second memory matrix holding MSLM 60 to implement subtraction in the MSLM 60, whereby a fraction corresponding to the right side second term of the equation (6) in the equation (5) is realized.

⑤ Learning Operation of the Input Layer—the Hidden Layer (Learning Operation 3 in FIG. 2)

The Learning Operation 3 is used to correct the memory matrix $w_{01}$ held in the first memory matrix holding MSLM 58 as expressed by the following equation:

$$W_{01}(n+1) = W_{01}(n) + \Delta W_{01} \quad (7)$$

where $\Delta w_{01}$ is a correction term of the memory matrix $w_{01}$ which is expressed by the following equation:

$$\Delta w_{01} = \eta \delta_1 x = \eta(f'(\text{net}1)\Sigma \delta_2 w_{12})x \quad (8)$$

It should be noticed here that $\Sigma \delta_2 w_{12}$ in the parenthesis of the equation (8) takes a positive or negative value which can not be processed intact by optical computing which takes only positive values with respect to an intensity signal. To solve this, the quantity $\Delta w_{01}$ is divided to positive and negative terms as expressed by the following equation, and the positive term is first added to and written into the MSLM and then the negative term is subtracted.

$$\Delta W_{01} = \eta_1 (f'(\text{net 1}) * (\Sigma \delta_2 W_{12})^+ - \eta_2 (f'(\text{net 1}) (\Sigma \delta_2 w_{12})- \quad (9)$$

More specifically, the right side first term of the equation (9) is first computed as a correction signal for the memory matrix $w_{01}$ and written into the first memory matrix holding MSLM 58, and then a result through the same route is subtracted from the memory matrix holding MSLM 58. Hereby, the desired computation is realized.

In the following a process to compute $\delta_2$ will first be described.

Because of the computations of $\Delta w_{12}$ in the Learning Operation 1, is expressed by the following equation:

$$\delta_2 = (t - y) f'(\text{net2}) \quad (10)$$
$$= tf'(\text{net2}) - yf'(\text{net2})$$

Figure 20:
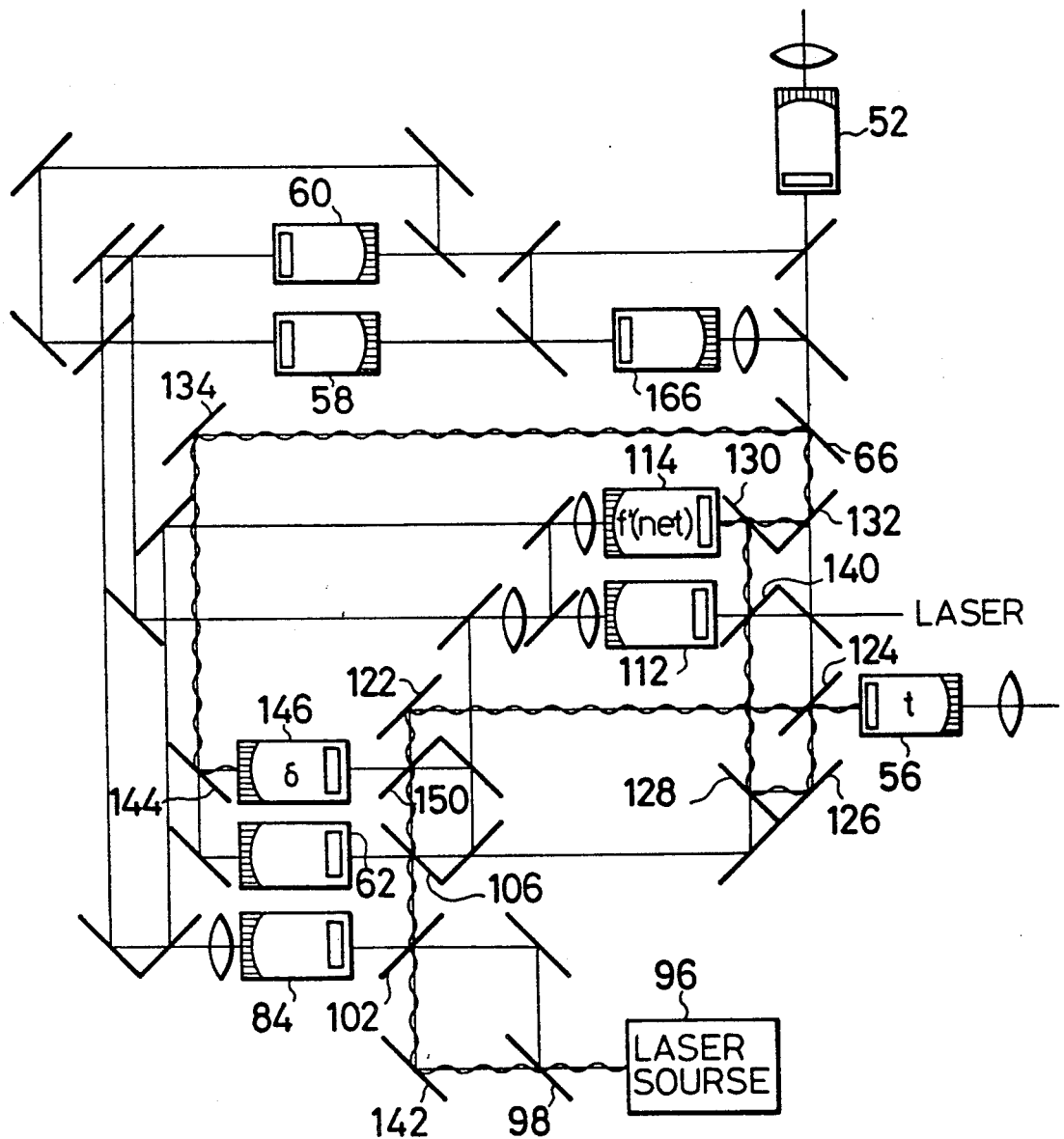
FIGS. 20 through 24 are views of optical paths each illustrating the operation of the learning operation 3.
Figure 21:
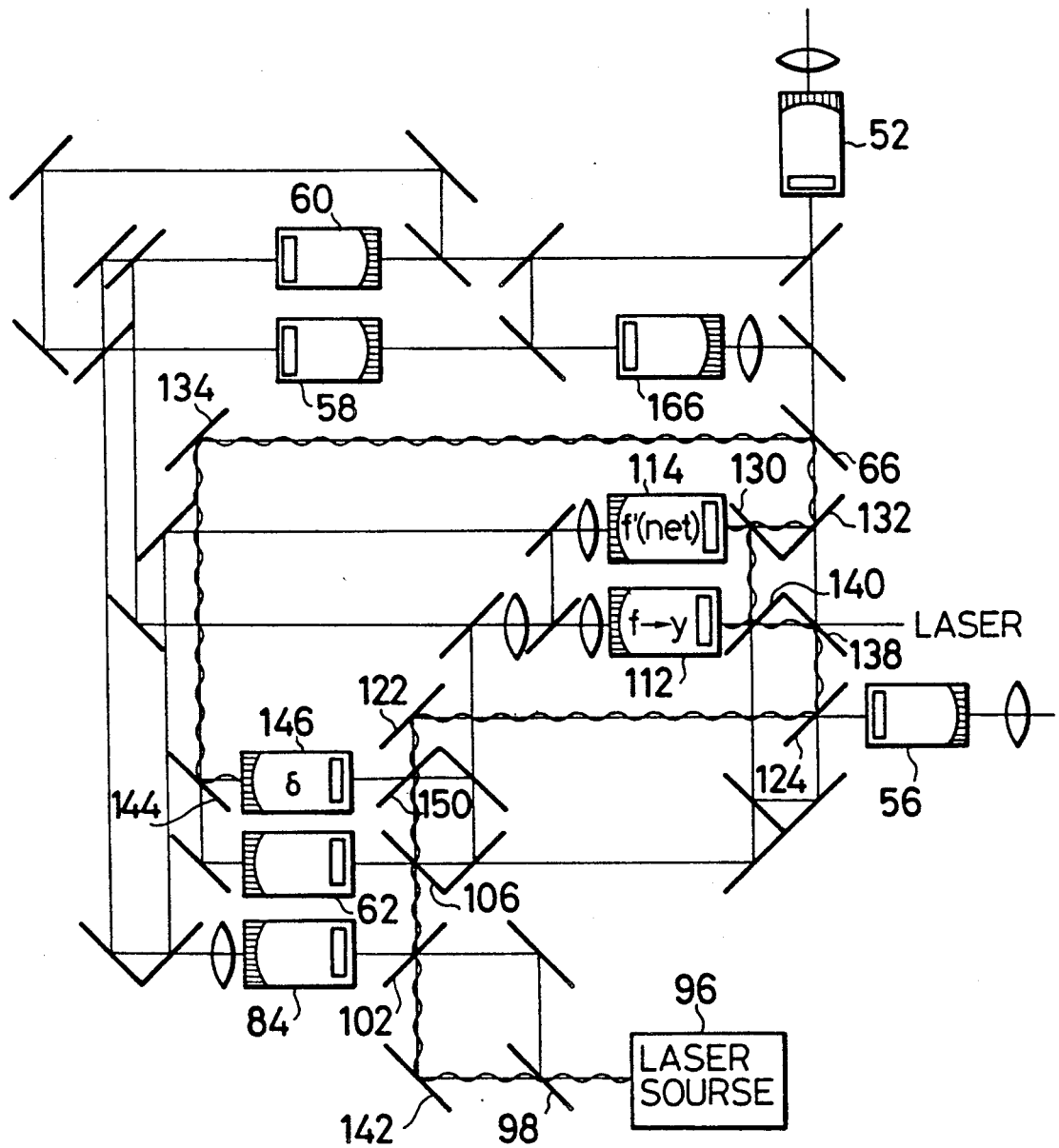

As shown in FIGS. 20 and 21, the result is written into the $\delta$ operating MSLM 146 for addition and subtraction. Herein, since the MSLM exhibits only positive values, any negative computation result is zero. More specifically, in the computation:

$$(t \cdot f'(\text{net 2}) - y \cdot f'(\text{net 2})),$$

only the positive quantities of:

$$(t \cdot f'(\text{net 2}) - y \cdot f'(\text{net 2})),$$

are given as $\delta_2$. Accordingly, in $$(y \cdot f'(\text{net 2}) - t \cdot f'(\text{net 2})),$$

i.e., in the case where $y \cdot f'(\text{net 2})$ is first added to an input into the MSLM and then $t \cdot f'(\text{net 2})$ is subtracted, negative quantities of:

$$(t \cdot f'(\text{net 2}) - y \cdot f'(\text{net 2})),$$

are expressed by absolute values (i.e., positive light intensity).

Figure 22:
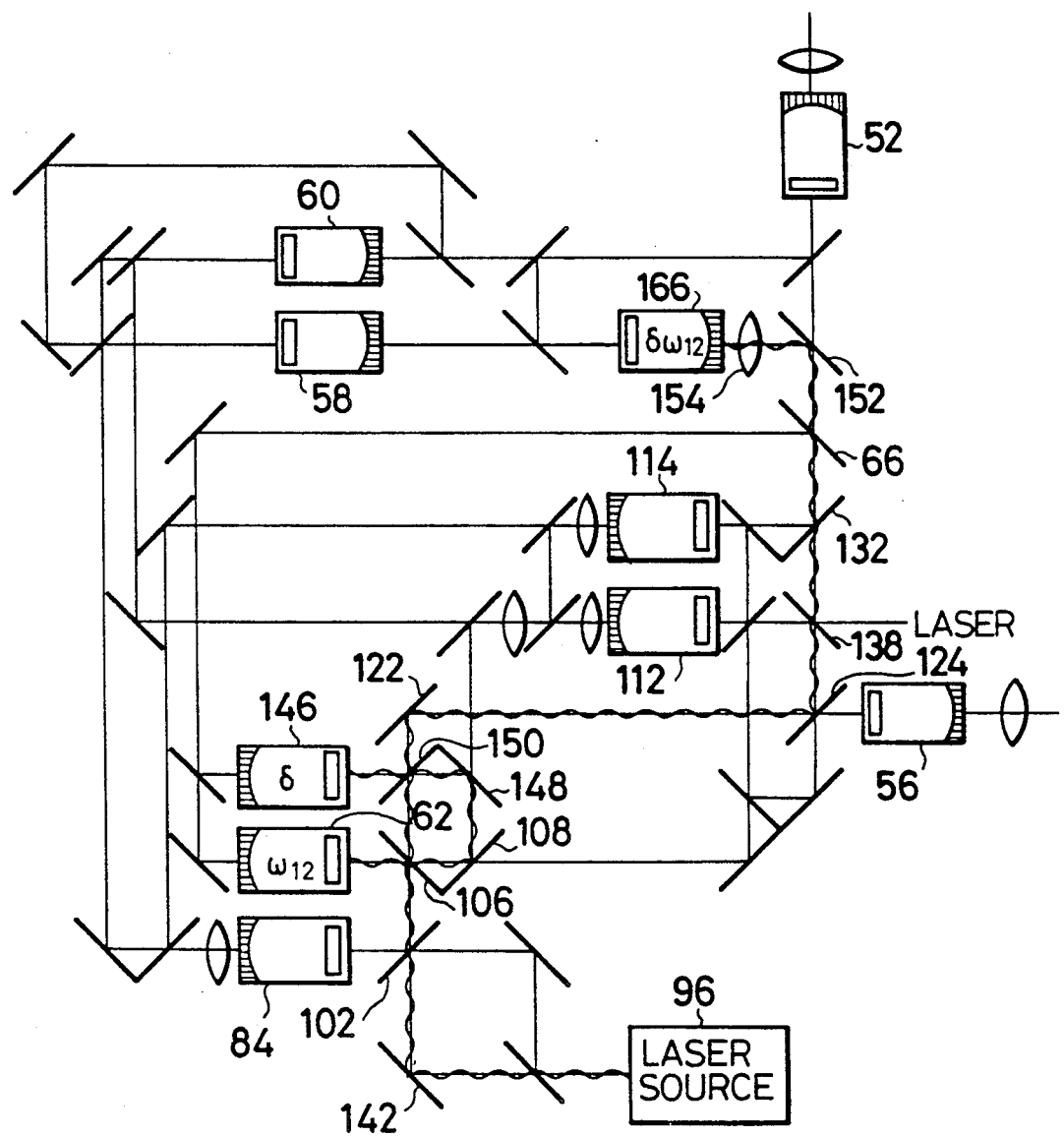
Figure 23:
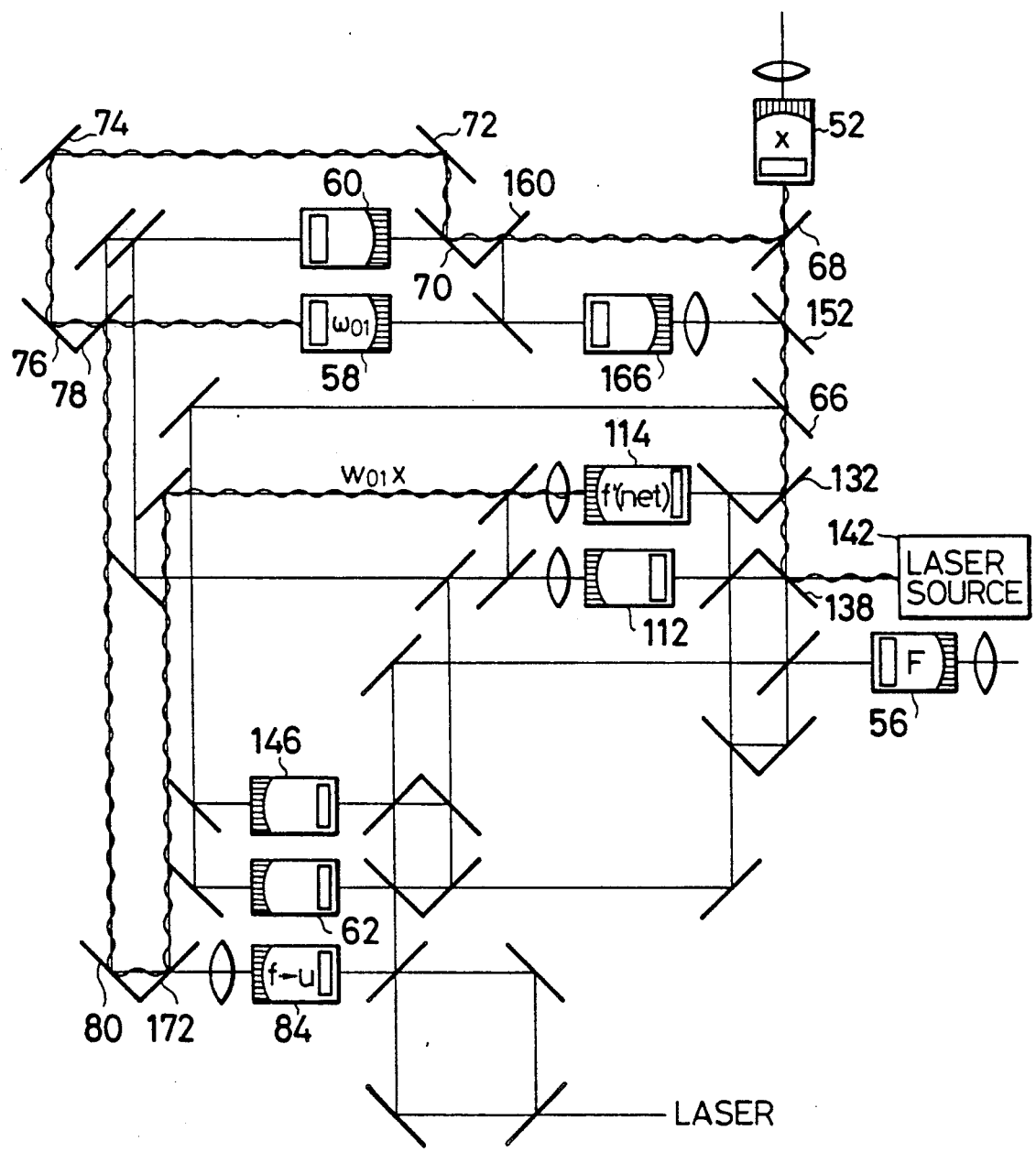
Figure 24:
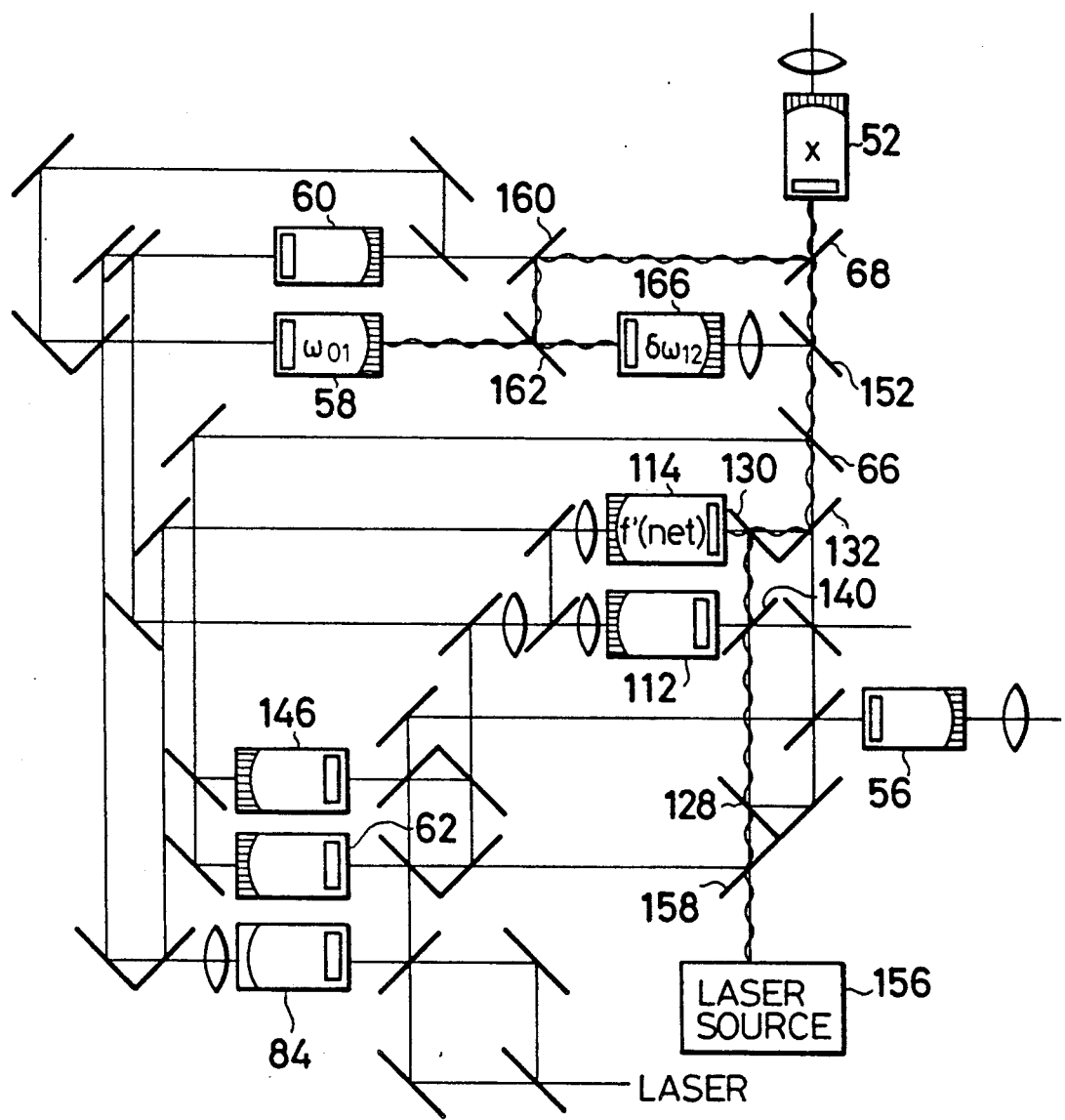

Then, computation $\Sigma \delta_2 \cdot w_{12}$ is realized, as illustrated in FIG. 22, by irradiating the third memory matrix holding MSLM 62 and the $\delta$ operating MSLM 146 with the laser light emitted from the laser light source 96, in order, to read the image $w_{12}$ and $\delta$ held in those MSLMs successively, and implementing the partial sum $\Sigma$ through the lens array 154 and writing a resulting value into the partial sum holding MSLM 166.

Additionally, the computation $\eta_1 \{f'(\text{net 1}) \Sigma (\delta_2 W_{12}) \cdot X\}^+$ is implemented as follows: similar to the route described in the "①  recalling of a hidden layer output u", net $1 = \Sigma w_{01}x$ is computed, and a result is entered into the output function differential operating MSLM 114 to obtain f'(net 1). The result f'(net 1) is held in the output function differential operating MSLM 114 by irradiating the same MSLM with the laser light emitted from the laser light source 142 through the half mirrors 66, 68 and 70, the mirrors 72, 74 and 76, the half mirror 78, the mirror 80, the half mirror 172, and the mirror 170. Finally, images f'(net 1), x and $\delta_{w12}$ held in the output function differential operating MSLM 114, the input pattern converting MSLM 52, and the partial sum holding MSLM 166 are read out successively by irradiating those MSLMs with the laser light emitted from the laser light source 156 in order, to realize the computation.

The above description is given for the right side first term, i.e., the positive term of the equation (9), and the right side second term, i.e., the negative term is also realizable with a similar process.

In the present embodiment, the multiple imaging system and the local imaging system are constructed with the lens array, respectively, to result in a simplified construction. Further, the construction of the multiple imaging system is not limited to the lens array and a diffraction grating for example may be used instead.

Figure 3:
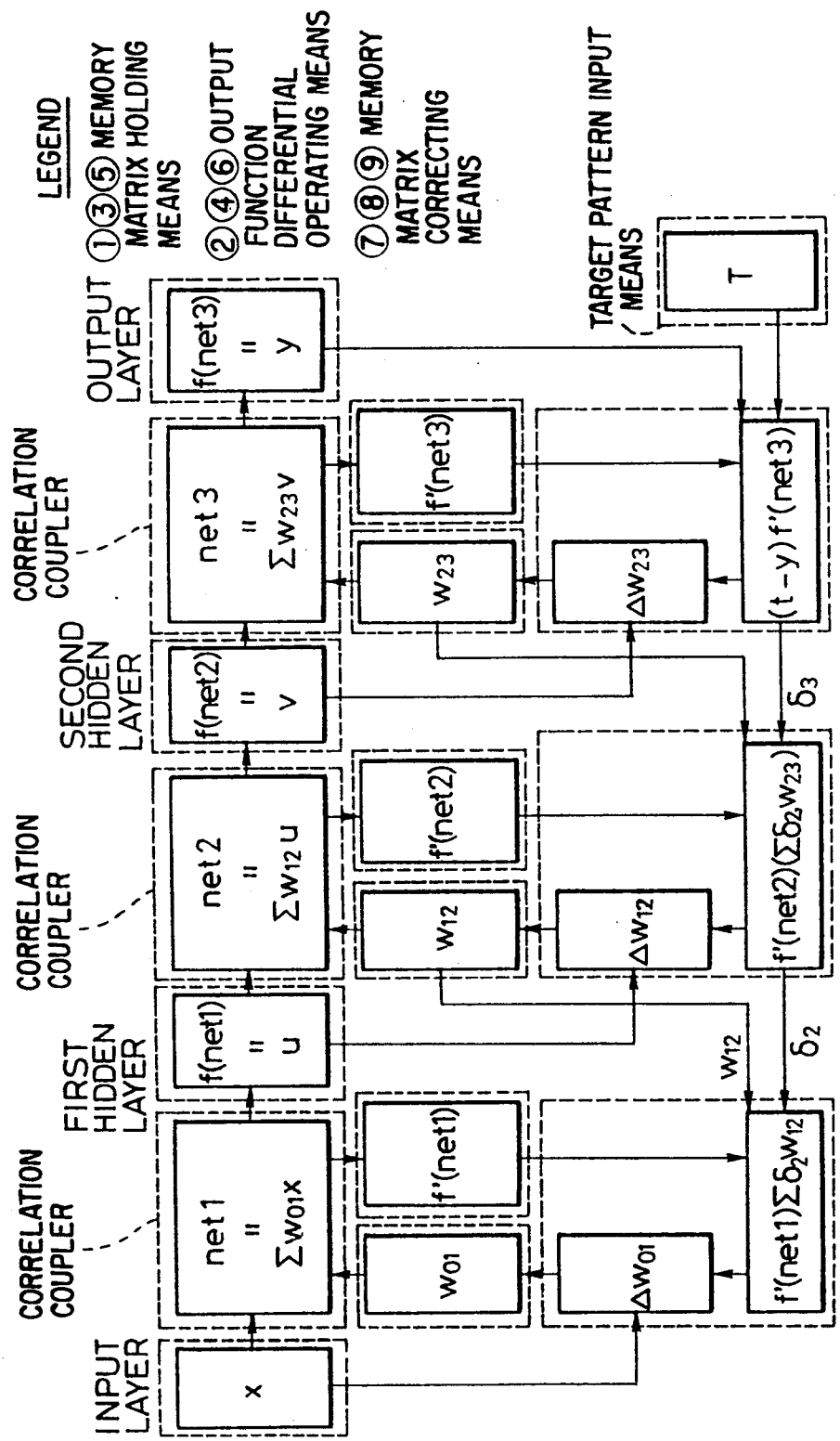
FIG. 3 is a block diagram illustrating the said construction of a simple four-layered optical neural network system according to the present invention.
Figure 4:
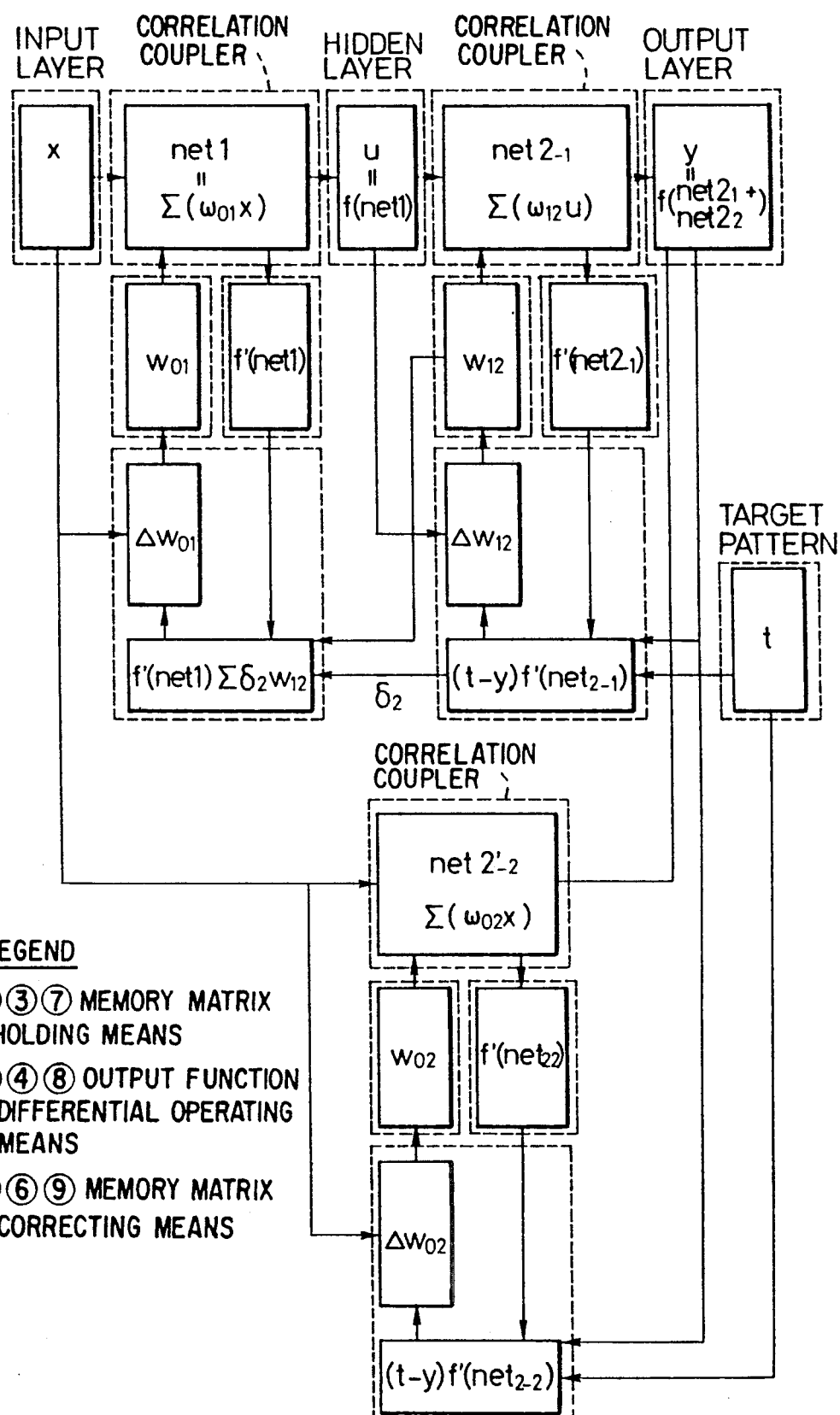
FIG. 4 is a block diagram illustrating the said construction of a complicated three-layered optical neural network system according to the present invention.

Additionally, although in the above embodiment the multilayerd neural network system was described as comprising three layers, i.e., the input layer, the hidden layer, and the output layer, the present invention is also applicable to a multilayered neural network system which includes two or more layers as the hidden layer, as illustrated in FIG. 3, without limitation in the number of layers to the above embodiment.

Moreover, although in the above mentioned learning was achieved with the back propagation system, learning systems to which the present invention is applicable are not limited thereto. For example, the present invention is also applicable to counter propagation where one sample is selected among those samples by allowing those samples to compete with each other, and applicable to a MADALINE that is a multilayered version of a threshold logical operation (ADALINE).

Furthermore, although in the above embodiment the MSLM was incorporated as an optical device, it requires a two-dimensional analog optical device with particularly good linearity because the dynamic range and linearity of the memory matrix excert influence on associative capability.

Accordingly, in the cases where the MSLM is incorporated, when a target pattern t is set with respect to an input pattern x formed of a plurality of signals (signals from various sensors in an object recognition system, for example), saturation of a memory matrix M is reduced to assure stable associative memory by setting the mean value of the target patterns t such that it is coincident with the means value of dynamic ranges of such memory matrixes M.

Additionally, saturation of the memory matrix M can be reduced by adjusting the initial value M(0) of the memory matrix upon starting learning such that it is coincident with the center of the dynamic ranges of the memory matrix M.

Figure 25:
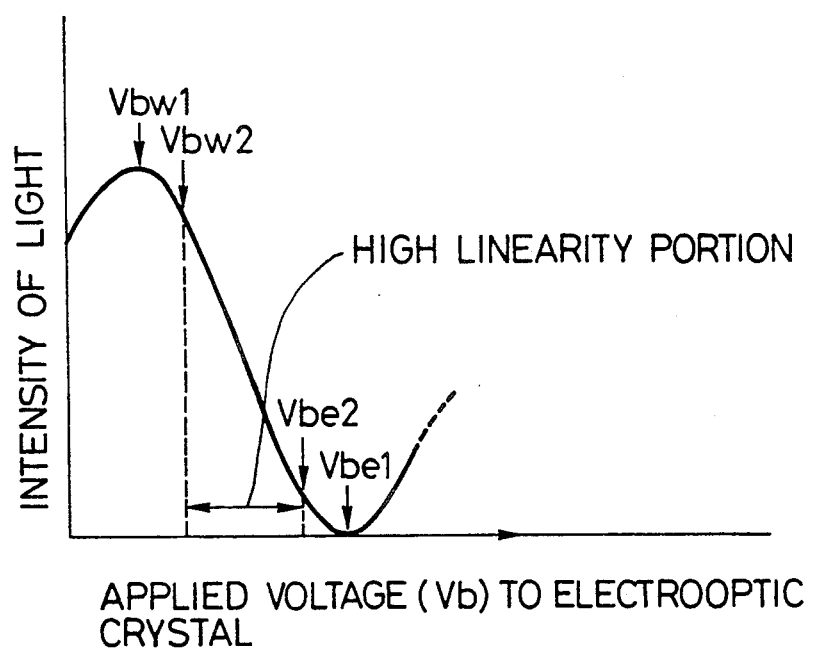
FIG. 25 is a diagram exemplarily illustrating voltage setting in the microchannel spatial light modulator that attaches importance to linearly in a modification of the aforementioned embodiment.

Furthermore, the MSLM exhibits an input/output function characteristic following $\sin^2$ curve. In learning, however, higher linearily is advantageous to reduce the distortion of a signal upon convergence of the signal. For this, operating voltages (application voltage Vb to electrooptic crystal) of an input pattern displaying MSLM and a memory matrix holding MSLM may be altered from a combination (Vbw1 (upon writing), Vbe1 (upon erasing)) that is normal set voltage for maximizing a dynamic range to a combination (Vbw2, Vbe2), as illustrated in FIG. 25. Thus, a good linear input/output characteristic can be achieved by the use of a central portion.

Additionally, for the optical device there are available, besides the MSLM, a liquid crystal light value LCLV and a BSO light modulator PROM.

What is claimed is:

1. A multilayered optical neural network system comprising:
   a) an input layer;
   b) an output layer;
   c) at least one hidden layer provided between said input layer ad said output layer;
   d) at least one memory matrix holding means provided between selected ones of said layers for holding a weight of coupling between said selected ones of said layers, said layers comprising said input, output and hidden layers;
   e) at least one correlation operating means for optically determining correlation between an output optical pattern from a first one of said layers and a memory matrix pattern held in a selected one of said memory matrix holding means;
   f) output function operating means for optically computing an output function corresponding to a result of said correlation determination and transferring said output function to a second one of said layers; and
   g) memory matrix correcting means provided between selected ones of said layers for optically correcting by learning the memory matrix held by said memory matrix holding means.

2. The multilayered optical neural network system of claim 1, wherein said network system further comprises at least one coupling means for coupling layers separated by at least one other layer.

3. The multilayered optical neural network system of claim 1, wherein said memory matrix correcting means optically corrects a memory matrix pattern held in one of said memory matrix holding means, based upon signals provided by at least one of: a downstream layer memory matrix holding means, said output function operating means, output function differential operating means for differentiating an output from said correlation operating means, and downstream layer corrected signal holding means.

4. The multilayer optical neural network system of claim 3, wherein said output function differential operating means implements optical computing with a microchannel spatial light modulator, mirrors and a wavelength plate.

5. A multilayered optical neural network system comprising:
   (a) an input multiple imaging system for multiplexing and imaging at least one input pattern;
   (b) an input pattern converting device for holding at least one input image pattern multiplexed and imaged by said input multiple imaging system;
   (c) a target multiple imaging system for multiplexing and imaging at least one target pattern;
   (d) a target pattern converting device for holding at least one target image pattern multiplexed and imaged by said target multiple imaging system;
   (e) a first memory matrix holding device for holding at least one first memory matrix pattern corresponding to a correlation between the at least one input image pattern and an at least one hidden layer output image pattern;
   (f) a second memory matrix holding device for holding at least one second memory matrix pattern corresponding to a correlation between the at least one input image pattern and at least one recalling output image pattern;
   (g) a third memory matrix holding device for holding at least one third memory matrix pattern corresponding to a correlation between the at least one hidden layer output image pattern and the at least one recalling output image pattern;
   (h) first correlation operating means for implementing optical computing of a Hadamard product between said at least one image pattern held in said input pattern converting device and said at least one first memory matrix pattern held in said first memory matrix holding device by successively reading out of the respective at least one patterns;
   (i) a first local imaging system for optically computing a partial sum by locally imaging by image pattern formed by said first correlation operating means;
   (j) a first output function operating device for providing said hidden layer output image pattern by optically computing an output function for the locally imaged image pattern;
   (k) second correlation operating means for optically computing a Hadamard product between said at least one image pattern held in said input pattern converting device and said at least one second memory matrix pattern held in said second memory matrix holding device by successively reading out of the respective at least one patterns;
   (l) third correlation operating means for optically computing a Hadamard product between said at least one image pattern held in said input pattern converting device and said at least one memory matrix pattern held in third memory matrix holding device by successively reading out of the respective at least one patterns;
   (m) a second local imaging system for optically computing a partial sum of image patterns formed by said second and third correlation operating means by locally imaging image patterns;
   (n) a second output function operating device for providing said recalling output image pattern by optically computing an output function for a locally imaged image pattern;
   (o) an output function differential operating device for optically differentiating the output functions of said first and second output function operating devices;
   (p) first memory matrix correcting means for correcting one of the at least one third memory matrix pattern held in said third memory matrix holding device by a learning operation between the hidden layer and the output layer using image patterns held in said first and second output function operating devices, said output function differential operating device, and said target pattern converting device;
   (q) second memory matrix correcting means for correcting one of the at least one second memory matrix pattern held in said second memory matrix holding device by a learning operation between the input layer and the output layer using image patterns held in said target pattern converting device, said second output function operating device, said output function differential operating device, and said input pattern converting device; and
   (r) third memory matrix correcting means for correcting one of the at least one first memory matrix pattern held in said first memory matrix holding device by a learning operation between the input layer and the hidden layer using images held in said input pattern converting device, said second output function operating device, said output function differential operating device, said target pattern converting device, and said third memory matrix holding device.

6. The multilayered optical neural network system of claim 5 wherein said first memory matrix correcting means comprises;
   (a) first multiplication means for optically computing a multiplication of transmittances of the image patterns held in said first output function operating device, said output function differential operating device, and said target pattern converting device, said multiplication performed by successive reading of the image patterns from the respective devices;
   (b) addition means for adding a result of the multiplication by said first multiplication means to one of the at least one third memory matrix pattern held in said third memory matrix holding device;
   (c) second multiplication means for optically computing a multiplication of transmittances of the image patterns held in said first and second output function operating devices and said output function differential operating device by successively reading of the respective image patterns from the devices; and
   (d) subtraction means for subtracting a result of the multiplication of said second multiplication means from one of the at least one third memory matrix pattern held in said third memory matrix holding device.

7. The multilayered optical neural network system of claim 5 wherein said second memory matrix correcting means comprises;
   (a) first multiplication means for optically computing a multiplication of transmittances of the image patterns held in said target pattern converting device, said output function differential operating device, and said input pattern converting device by successively reading of the respective image patterns from the devices;
   (b) addition means for adding a result of the multiplication by said first multiplication means to one of the at least one second memory matrix pattern held in said second memory matrix holding device;
   (c) second multiplication means for optically computing a multiplication of transmittances of the image patterns held in said first output function operating device, said output function differential operating device and said input pattern converting device by successively reading of the respective image patterns from the devices; and
   (d) subtraction means for subtracting a result of the multiplication by said second multiplication means from one of the at least one second multiplication means from one of the at least one second memory matrix pattern held in said second memory matrix holding device.

8. The multilayered optical neural network system of claim 5 wherein said third memory matrix correcting means comprises;
   (a) first multiplication means for optically computing a multiplication of transmittances of the image patterns held in said target pattern converting means and said output function differential operating device by successively reading of the respective image patterns from the devices;
   (b) second multiplication means for optically computing a multiplication of transmittances of the image patterns held in said second output function operating device and said output function differential operating device by successively reading of the respective image patterns from the devices;
   (c) an operation result holding device for holding a result of addition of outputs from said first multiplication means and subtraction of an output from said second multiplication means;
   (d) fourth correlation operating means for optically computing a Hadamard product between image patterns held in said operation result holding device and at least one third memory matrix pattern held in said third memory matrix holding device by successively reading of the respective image patterns from the devices;
   (e) a third local imaging system for optically computing a partial sum of an image pattern formed by said fourth correlation operating means by locally imaging said image pattern;
   (f) a partial sum holding device of holding the partial sum formed by said third local imaging system;
   (g) fifth correlation operating means for optically computing a Hadamard product between image patterns held in said partial sum holding device, said input pattern converting device, and said output function differential operating device by successively reading of the respective image patterns from the devices; and
   (h) addition/subtraction means for one of adding and subtracting a result of the operation of said fifth correlation operating means to and from one of the at least one first memory matrix pattern held in said first memory matrix holding device.

9. The multilayered optical neural network system of claim 8 wherein said addition/subtraction means separates the operation into an addition operation and a subtraction operation for first adding a result of an operation for a positive fraction to said one of the at least one first memory matrix pattern and then subtracting a result of an operation of a negative fraction from said one of the at least one first memory matrix pattern.

* * * * *